United States Patent
Okumura

(10) Patent No.: US 7,480,691 B2
(45) Date of Patent: Jan. 20, 2009

(54) ARITHMETIC DEVICE FOR MULTIPLE PRECISION ARITHMETIC FOR MONTGOMERY MULTIPLICATION RESIDUE ARITHMETIC

(75) Inventor: Yoshiki Okumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 716 days.

(21) Appl. No.: 10/781,634

(22) Filed: Feb. 20, 2004

(65) Prior Publication Data

US 2004/0167955 A1 Aug. 26, 2004

(30) Foreign Application Priority Data

Feb. 24, 2003 (JP) ............... 2003-046527

(51) Int. Cl.
G06F 7/52 (2006.01)
G06F 7/38 (2006.01)

(52) U.S. Cl. ...................... 708/628; 708/491

(58) Field of Classification Search ................ 708/491, 708/625, 628, 425, 428

See application file for complete search history.

(56) References Cited

U.S. PATENT DOCUMENTS 5,303,178 A * 4/1994 Ozaki .................... 708/632
5,436,860 A * 7/1995 Shankar et al. ............. 708/625
5,442,576 A * 8/1995 Gergen et al. .............. 708/209
5,513,133 A 4/1996 Cressel et al.
5,742,530 A 4/1998 Gressel et al.
5,796,645 A * 8/1998 Peh et al. ................... 708/603
5,982,900 A 11/1999 Ebihara et al.
6,178,190 B1 1/2001 Naniwae et al.

FOREIGN PATENT DOCUMENTS

| JP | 7-253949 | 10/1995 |
|---|---|---|
| JP | 9-274560 | 10/1997 |
| JP | 11-212456 | 8/1999 |
| JP | 2001-318785 | 11/2001 |

* cited by examiner

*Primary Examiner*—Chuong D Ngo
(74) *Attorney, Agent, or Firm*—Staas & Halsey LLP

(57) ABSTRACT

In an arithmetic device which performs a multiplication of a multiplicand A and a multiplier B expressed by bit patterns using a secondary Booth algorithm, an encoder selects a partial product indicating −A when the value of i specifying three consecutive bits of B is 0, and selects a partial product indicating 0 when the value of i is not 0. An addition circuit generates a two's complement of A from the partial product indicating −A, and outputs it as a multiplication result.

22 Claims, 15 Drawing Sheets

```
Y = c1 = c2 = tmp = 0
for ( j=0; j<g; j=j+1 ) {
    (c1, tmp) = a_0 * b_j + y_0 + c1                    (1)
    m = tmp * n'_0                                       (2)
    (c2, tmp) = m * n_0 + tmp + c2                       (3)
    for ( i=1; i<g; i=i+1 ) {
        (c1, tmp) = a_i * b_j + y_i + c1                 (1)
        (c2, y_{i-1}) = m * n_i + tmp + c2               (4)
    }
    (y_g, y_{g-1}) = y_g + c1 + c2                       (5)
}
if ( Y ≧ N ) {                                           (6)
    Y = Y - N
}
```

↑ TRANSFORM

```
Y = c1 = c2 = tmp = 0
for ( j=0; j<g; j=j+1 ) {
    for ( i=0; i<g+1; i=i+1 ) {                          (5)
        if ( i == g ) {                                  (1)
            (y_i, y_{i-1}) = y_i + c1 + c2
        } else {
            (c1, tmp) = a_i * b_j + y_i + c1             (2)
            if ( i == 0 ) {                              (3)
                m = tmp * n'_0
                (c2, tmp) = m * n_i + tmp + c2
            } else {
                (c2, y_{i-1}) = m * n_i + tmp + c2       (4)
            }
        }
    }
}
if ( Y ≧ N ) {                                           (6)
    Y = Y - N
}
```

FIG. 1A

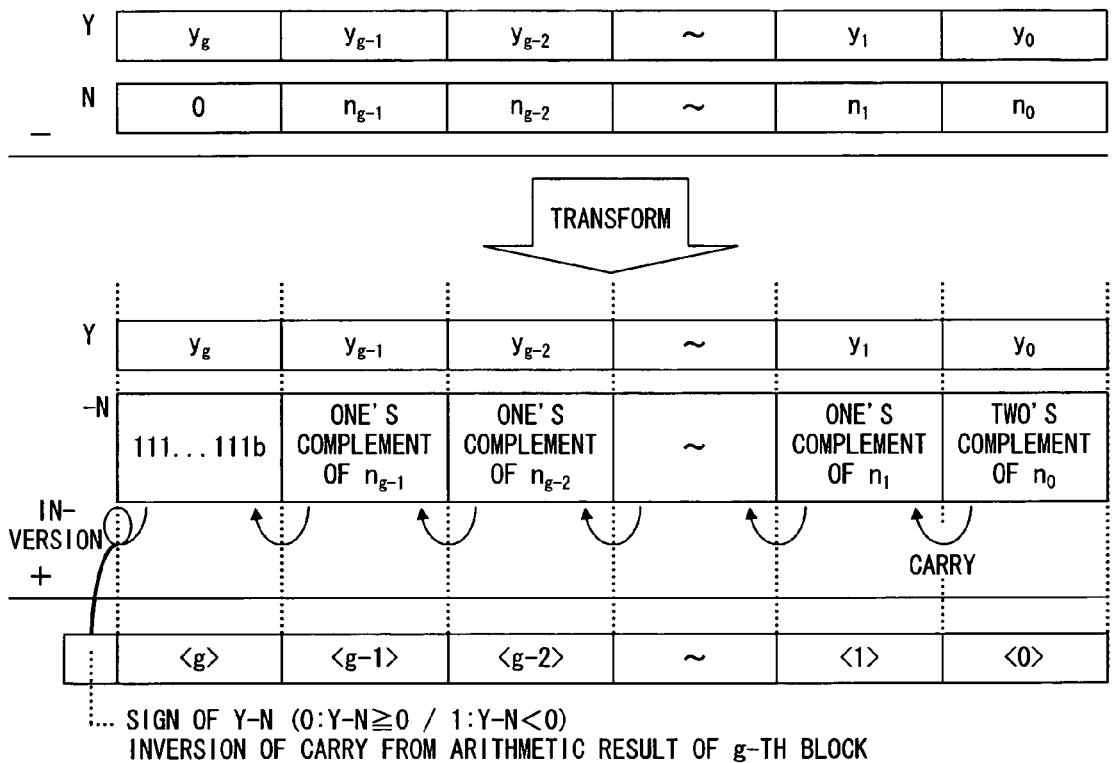
F I G. 1 C

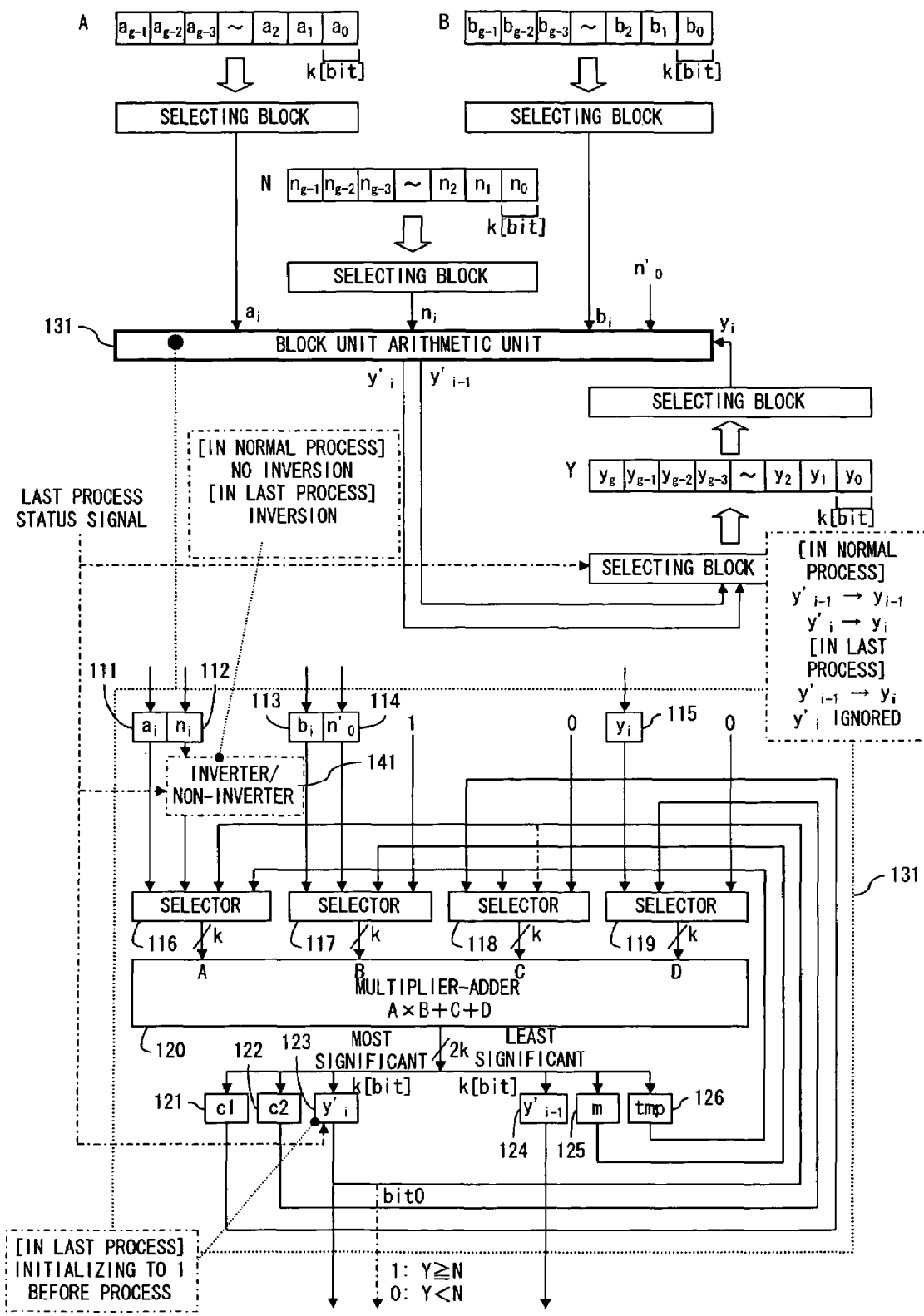
F I G. 1D

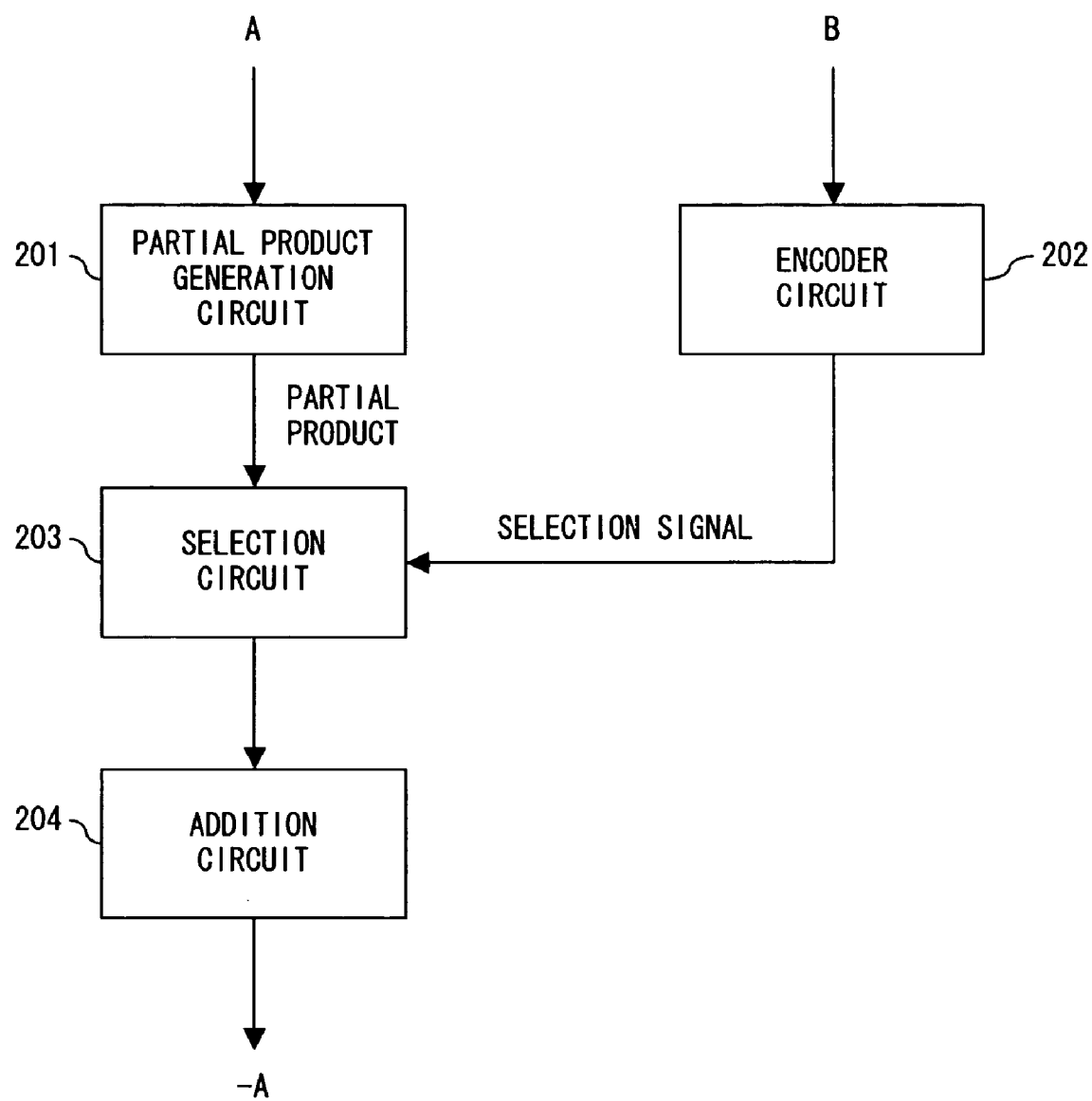
F I G. 2 A

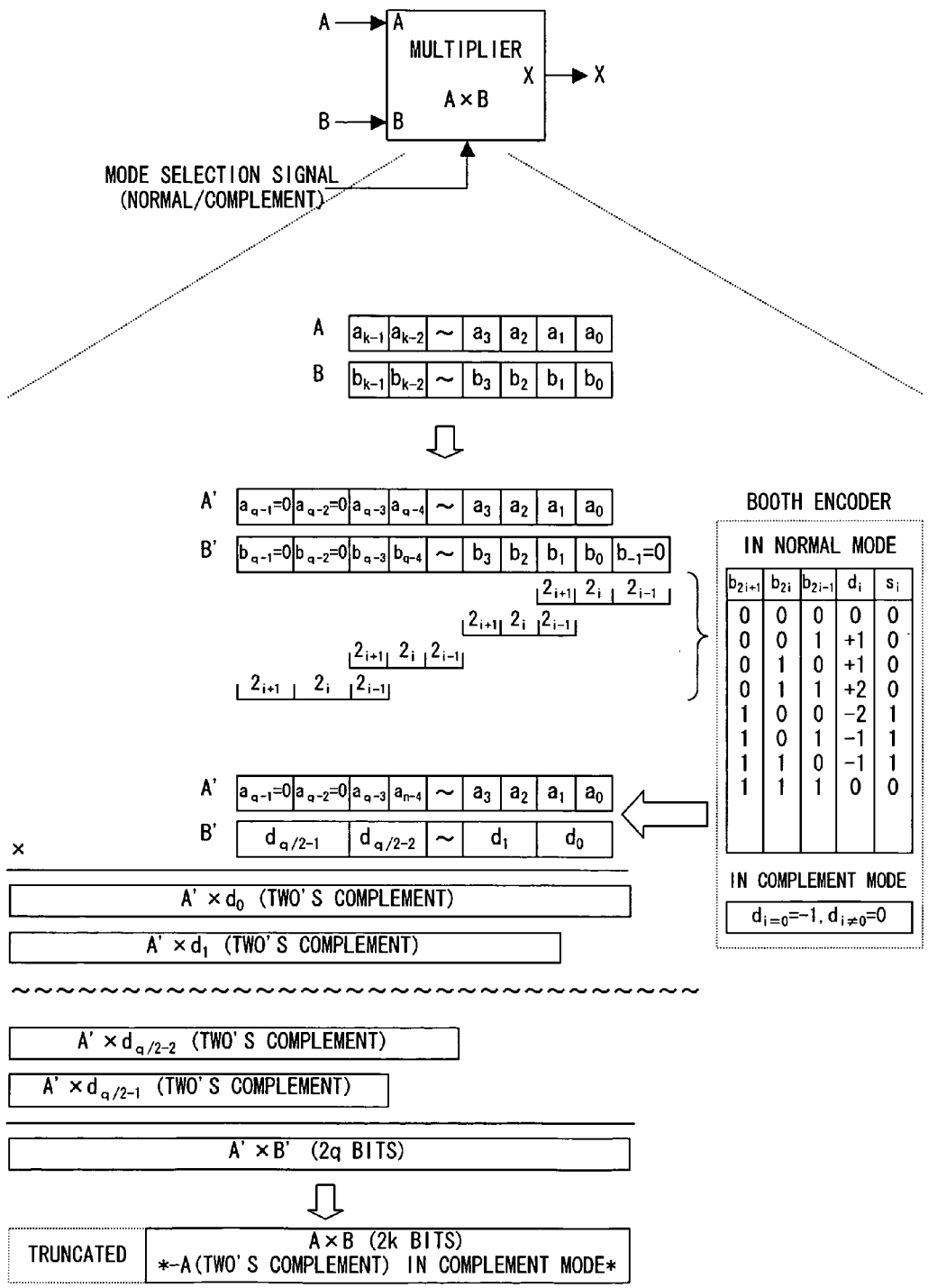
F I G. 3

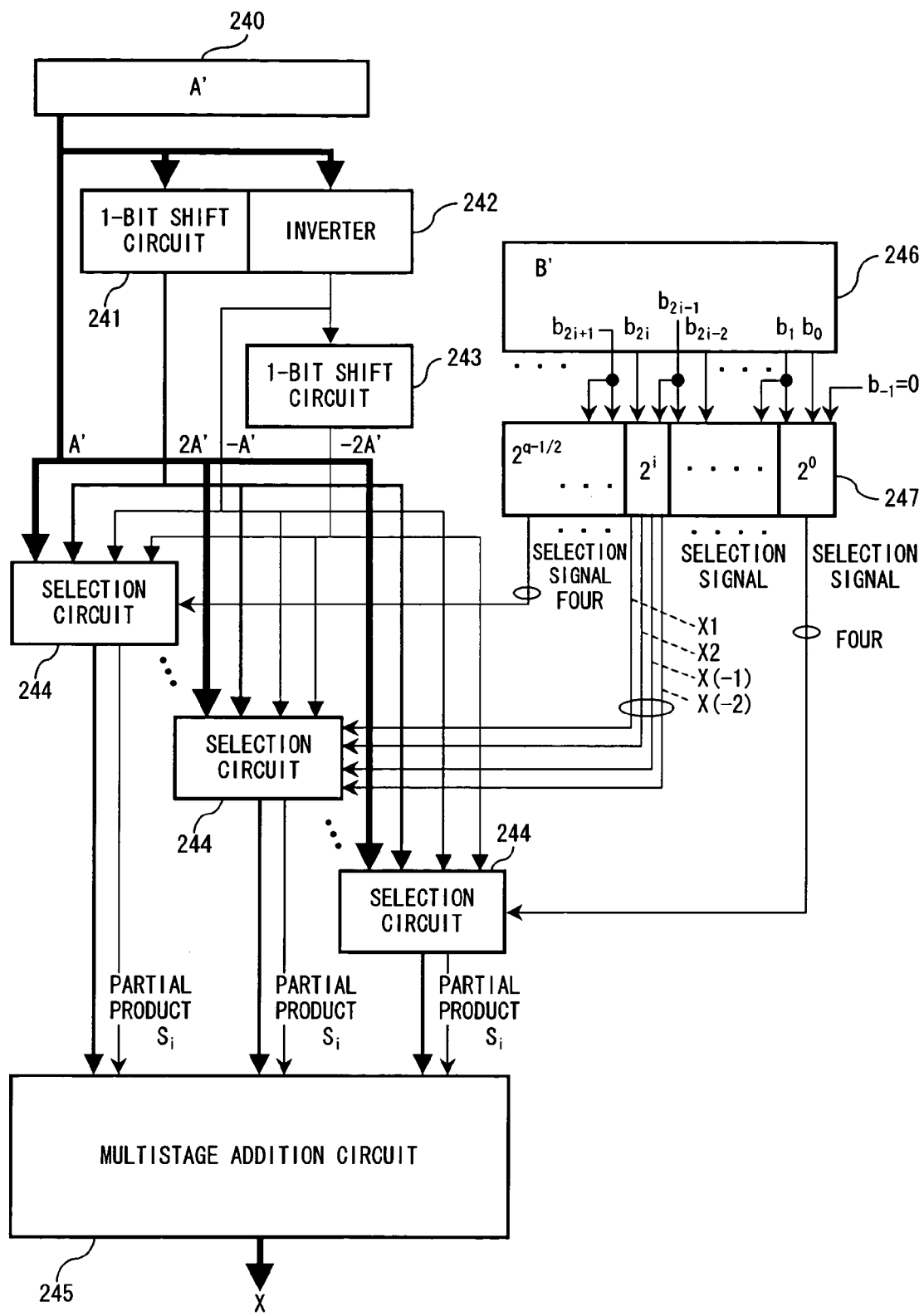
F I G. 5

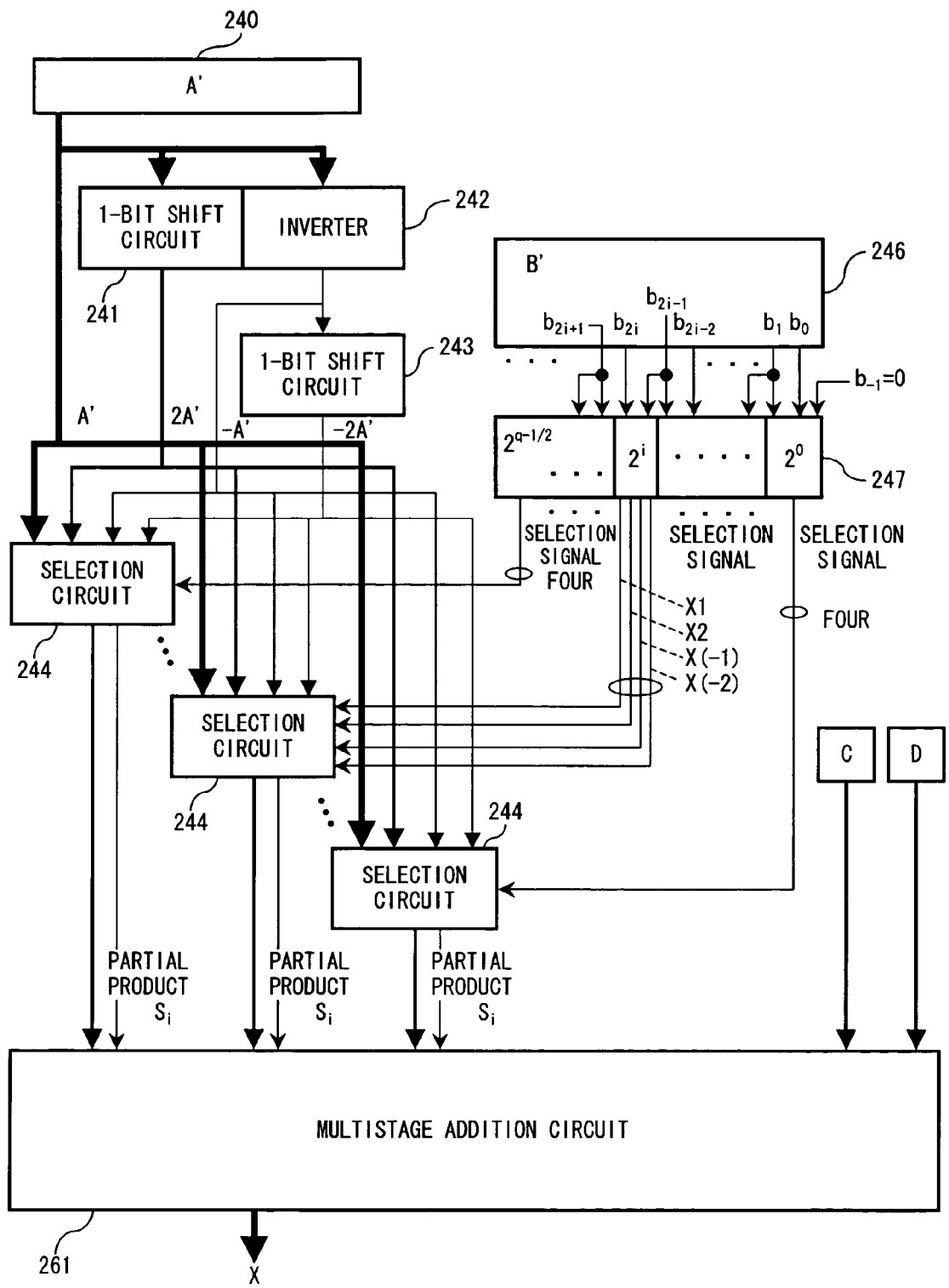
F I G. 7

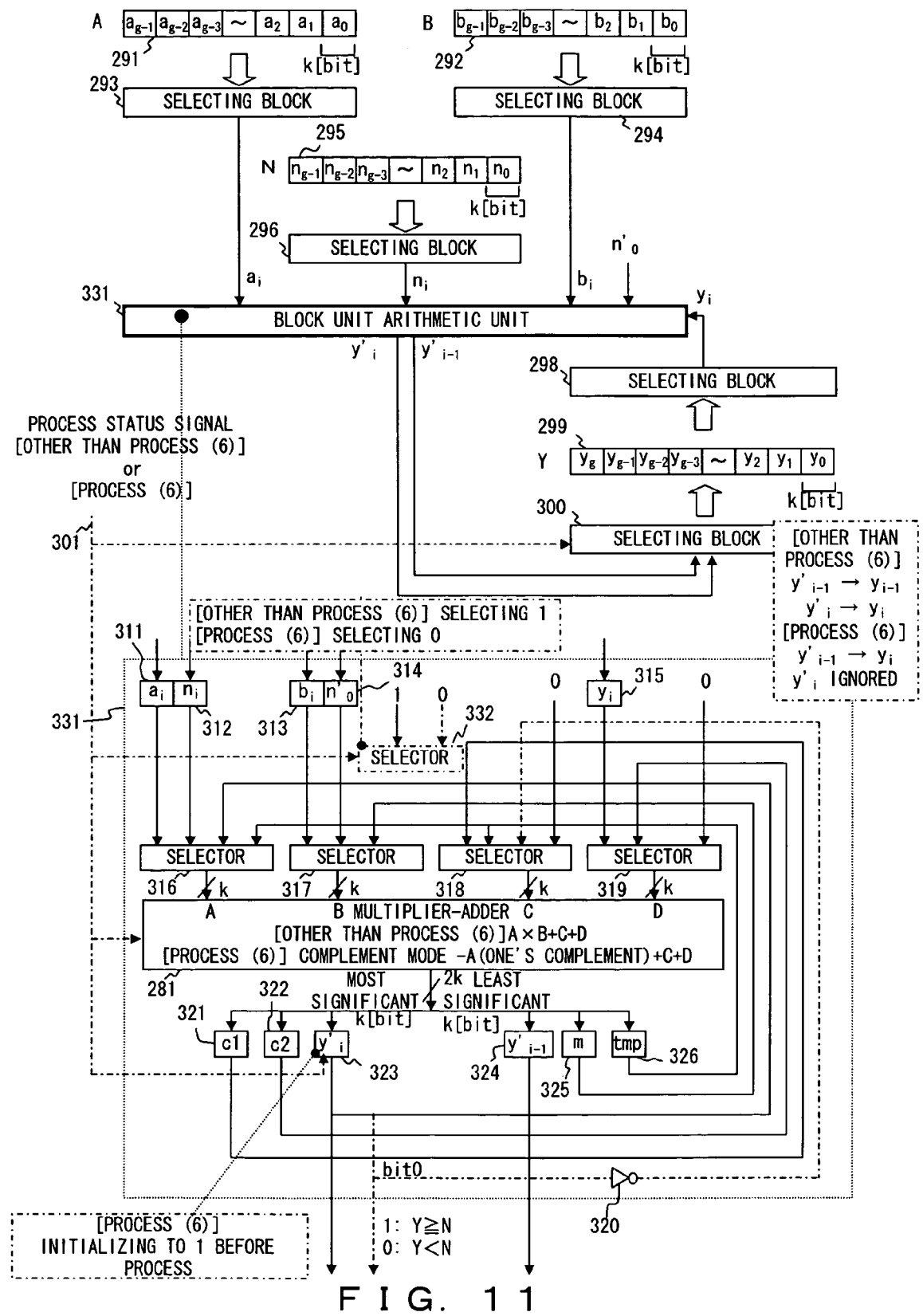
F I G. 11

ARITHMETIC DEVICE FOR MULTIPLE PRECISION ARITHMETIC FOR MONTGOMERY MULTIPLICATION RESIDUE ARITHMETIC

BACKGROUND OF THE INVENTION

1. Field of the Invention

The present invention relates to an arithmetic device for performing multiple precision arithmetic for Montgomery multiplication residue arithmetic.

2. Description of the Related Art

Recently, encrypted data communications and user authentication (digital signature) are commonly used as security policies over a computer network. In these security policies, a cryptographic process such as RSA (Rivest-Shamir-Adleman) cryptography, elliptical curve cryptography, etc. are popularly used.

Since numerics of a large number of bits are processed in the RSA cryptography and the elliptical curve cryptography, a multiple precision arithmetic algorithm which can be easily realized by software and hardware is frequently used in Montgomery multiplication residue arithmetic used in the above-mentioned cryptographic processes. A multiple precision arithmetic algorithm refers to an algorithm of repeating operations in block units after dividing a numeric of a large number of bits into blocks of a number of bits easily processed by software and hardware.

The algorithm as shown in FIG. 1A is well known (for example, refer to Patent Literature 1: Japanese Patent Application Laid-open No. H11-212456) as multiple precision arithmetic algorithm for Montgomery multiplication residue arithmetic. In FIG. 1A, A and B are integers, N is a modulus of residue arithmetic, and Y is an arithmetic result. The algorithm shown on the left of FIG. 1A can be transformed into one shown on the right thereof. The algorithm indicates the operation of $Y = AB2^{-kg} \bmod N$, and includes the processes (1) through (6).

"g" indicates the number of blocks of A, B, and N when A, B, and N are divided by k bits=1 block, and the number of blocks of Y is g+1. $a_i$, $b_i$, $n_i$, and $y_i$ respectively indicate the i-th block of A, B, N, and Y. A, B, N, and Y are expressed as follows using $a_i$, $b_i$, $n_i$, and $y_i$.

$A = (a_{g-1}, a_{g-2}, \ldots, a1, a0)$ $B = (b_{g-1}, b_{g-2}, \ldots, b1, b0)$ $N = (n_{g-1}, n_{g-2}, \ldots, n1, n0)$ $Y = (y_g, y_{g-1}, \ldots, y1, y0)$ $2^{-kg}$ is a reciprocal of $2^{kg}$ with N as the modulus of residue arithmetic. $n'_0$ indicates the least significant block (0-th block) obtained when N' satisfying $R \cdot R^{-1} - N \cdot N' = 1$ ($0 \leq R^{-1} < N$, $0 \leq N' < R$) where $R = 2^{kg}$ is divided by k bits=1 block. c1, c2, m, and tmp are k-bit work variables, and i and j are loop variables.

When the algorithm shown in FIG. 1A except for the process (6) is represented by a circuit, it is considered that the circuit as shown in FIG. 1B is the most likely to be realized. In the circuit shown in FIG. 1B, each of the A, B, and N are divided into g blocks, and each block is input to a block unit arithmetic unit 101. Arithmetic results $y'_i$ and $y'_{i-1}$ are stored in the blocks $y_i$ and $y_{i-1}$ of Y, respectively. At this time, $y_i$ required in the operation is read from Y, and input to the block unit arithmetic unit 101.

The block unit arithmetic unit 101 is provided with registers 111, 112, 113, 114, 115, 121, 122, 123, 124, 125, 126, and selectors 116, 117, 118, and 119, and a multiplier-adder 120 as shown at the lower portion in FIG. 1B. The multiplier-adder 120 performs the operation of A×B+C+X. The relationship between the circuit shown in FIG. 1B and the processes (1) through (5) of the algorithm shown in FIG. 1A is described below.

$(c1, \text{tmp}) = a_i * b_j + y_i + c1$ \hfill Process (1)

The selector 116 selects A=$a_i$, the selector 117 selects B=$b_j$, the selector 118 selects C=c1, and the selector 119 selects D=$y_i$. The most significant k bits of the output of the multiplier-adder 120 are stored in the register 121 as c1, the least significant k bits are stored in the register 126 as tmp.

$m = \text{tmp} * n'_0$ \hfill Process (2)

The selector 116 selects A=tmp, the selector 117 selects B=$n'_0$, the selector 118 selects C=0, the selector 119 selects D=0, the least significant k bits of the output of the multiplier-adder 120 are stored in the register 125 as m.

$(c2, \text{tmp}) = m * n_j + \text{tmp} * c2$ \hfill Process (3)

The selector 116 selects A=$n_j$, the selector 117 selects B=m, the selector 118 selects C=tmp, the selector 119 selects D=c2, the most significant k bits of the output of the multiplier-adder 120 are stored in the register 122 as c2, and the least significant k bits are stored in the register 126 as tmp.

$(c2, y_{i-1}) = m * n_j + \text{tmp} + c2$ \hfill Process (4)

The selector 116 selects A=$n_j$, the selector 117 selects B=m, the selector 118 selects C=tmp, the selector 119 selects D=c2, the most significant k bits of the output of the multiplier-adder 120 are stored in the register 122 as c2, and the least significant k bits are stored in the register 124 as $y'_{i-1}$. The contents of the register 124 are stored in the $y_{i-1}$ of Y.

$(y_i, y_{i-1}) = y_i + c1 + c2$ \hfill Process (5)

The selector 116 selects A=$y'_i$, the selector 117 selects B=1, the selector 118 selects C=c1, the selector 119 selects D=c2, the most significant k bits of the output of the multiplier-adder 120 are stored in the register 123 as $y'_i$, and the least significant k bits are stored in the register 124 as $y'_{i-1}$. The contents of the registers 123 and 124 are stored in the $y_i$ and $y_{i-1}$ of Y, respectively.

When the process (6) of the algorithm shown in FIG. 1A is added to the circuit shown in FIG. 1B to complete the circuit as a circuit of a multiple precision arithmetic algorithm for Montgomery multiplication residue arithmetic, as in the processes other than the process (6), a multiple precision subtraction as shown in FIG. 1C in which Y and N are divided by k bits=1 block and an operation is repeated on each block is adopted, and the circuit shown in FIG. 1D is obtained in most cases.

FIG. 1D shows a circuit obtained by transforming the multiple precision subtraction shown at the upper portion in FIG. 1C into the addition shown at the lower portion in FIG. 1C using the two's complement representation. A two's complement is used to represent a negative value in a computer, and obtained by adding 1 to a one's complement. A one's complement can be obtained by inverting a bit pattern.

In FIG. 1D, the block unit arithmetic unit 101 shown in FIG. 1B is replaced with a block unit arithmetic unit 131. The block unit arithmetic unit 131 has a configuration obtained by adding an inverter/non-inverter 141 to the block unit arithmetic unit 101.

In the operations of the circuit shown in FIG. 1D, the operation corresponding to the process (normal process)

other than the process (6) of the algorithm shown in FIG. 1A is the same as that of the circuit shown in FIG. 1B. Therefore, only the operation corresponding to the process (last process) (6) is described below. In this process, the inverter/non-inverter 141 inverts and outputs $n_i$ according to a last process status signal, $y'_i$ of the register 123 is initialized to 1, and $y'_{i-1}$ output from the block unit arithmetic unit 131 is stored in $y_i$ of Y.

(1) $y'_i$ is initialized to 1.
(2) The following operations are repeated in the range of $0 \leq i \leq g$.
   The selector 116 selects A=inversion (one's complement) of $n_i$, the selector 117 selects B=1, the selector 118 selects C=$y'_i$ (carry from the result of $y_{i-1} - n_{i-1}$), the selector 119 selects D=$y_i$, and the most significant k bits of the output of the multiplier-adder 120 are stored in the register 123 as $y'_i$.
(3) When bit 0 (least significant bit) of $y'_i$ is 1 (Y≧N), control is passed to (4). When bit 0 of $y'_i$ is 0 (Y<N), control is passed to (5).
(4) The following operations are repeated in the range of $0 < i < g$.
   The selector 116 selects A=inversion (one's complement) of $n_i$, the selector 117 selects B=1, the selector 118 selects C=$y'_i$ (carry from the result of $y_{i-1} - n_{i-1}$) the selector 119 selects D=$y_i$, the most significant k bits of the output of the multiplier-adder 120 are stored in the register 123 as $y'_i$, and the least significant k bits are stored in the register 124 as $y'_{i-1}$. The contents of the register 124 are stored in $y_i$ of Y.
(5) The operations are terminated.

However, the above-mentioned hypothetical multiple precision arithmetic circuit has the following problems.

In the circuit shown in FIG. 1D, the circuit storing A, B, N, Y, c1, c2, m, and tmp is normally configured by a RAM (random access memory) or FF (flip-flop) which is synchronous with an operation clock. Therefore, the multiplier-adder 120 and the selectors 116 through 119 immediately before the multiplier-adder 120 are in the way between the output (A, B, N, Y, c1, c2, m, and tmp) of the RAM or FF and the input (Y, c1, c2, m, and tmp) of the RAM or FF. Therefore, if the total delay time of the multiplier-adder 120 and the selectors 116 through 119 is shorter than the period of the operation clock, then the circuit does not totally operate.

Therefore, the bottleneck in improving the operation frequency of the circuit shown in FIG. 1D is the maximum delay path <ni→inverter/non-inverter 141→selector 116→multiplier-adder 120→(c1, c2, $y'_i$, $y_{i-1}$, m, tmp)> of the block unit arithmetic unit 131, and the problem is to shorten the path.

SUMMARY OF THE INVENTION

The present invention aims at providing an arithmetic device for shortening the delay time for a subtraction performed by a block unit arithmetic unit in a circuit which performs multiple precision arithmetic for Montgomery multiplication residue arithmetic, and performing multiple precision arithmetic with the operation frequency maintained.

The arithmetic device according to the present invention includes a partial product generation circuit, an encoder circuit, a selection circuit, and an addition circuit, and performs a multiplication of a multiplicand A and a multiplier B expressed by bit patterns.

The partial product generation circuit generates a plurality of partial products in a secondary Booth algorithm from the multiplicand A. The encoder circuit encodes the multiplier B based on the secondary Booth algorithm, and outputs a selection signal depending on the value of i specifying three consecutive bits $b_{2i+1}$, $b_{2i}$, and $b_{2i-1}$ of the multiplier B. The selection circuit selects and outputs one of the plurality of partial products according to the selection signal. The addition circuit adds up the partial products equal in number to i output from the selection circuit, and generates a multiplication result.

Then, the arithmetic device has an operation mode in which the encoder circuit outputs a selection signal for selection of a partial product indicating −A when i is 0, outputs a selection signal for selection of a partial product indicating 0 when i is a value other than 0, and the addition circuit generates a two's complement of the multiplicand A from the partial product indicating −A, and outputs the two's complement of the multiplicand A as the multiplication result. In this operation mode, the addition circuit can generate a one's complement of the multiplicand A instead of generating a two's complement of the multiplicand A from the partial product indicating −A.

BRIEF DESCRIPTION OF THE DRAWINGS

FIG. 1A shows a multiple precision arithmetic algorithm for Montgomery multiplication residue arithmetic;
FIG. 1C shows a multiple precision subtraction;
FIG. 1D shows a hypothetical multiple precision arithmetic circuit;
FIG. 2A shows the principle of the arithmetic device according to the present invention;
FIG. 3 shows a first multiplier;
FIG. 5 shows the configuration of the circuit of a multiplier;
FIG. 7 shows the configuration of the circuit of a multiplier-adder;
FIG. 11 shows a second multiple precision arithmetic circuit.

DESCRIPTION OF THE PREFERRED EMBODIMENTS

Figure 1B:
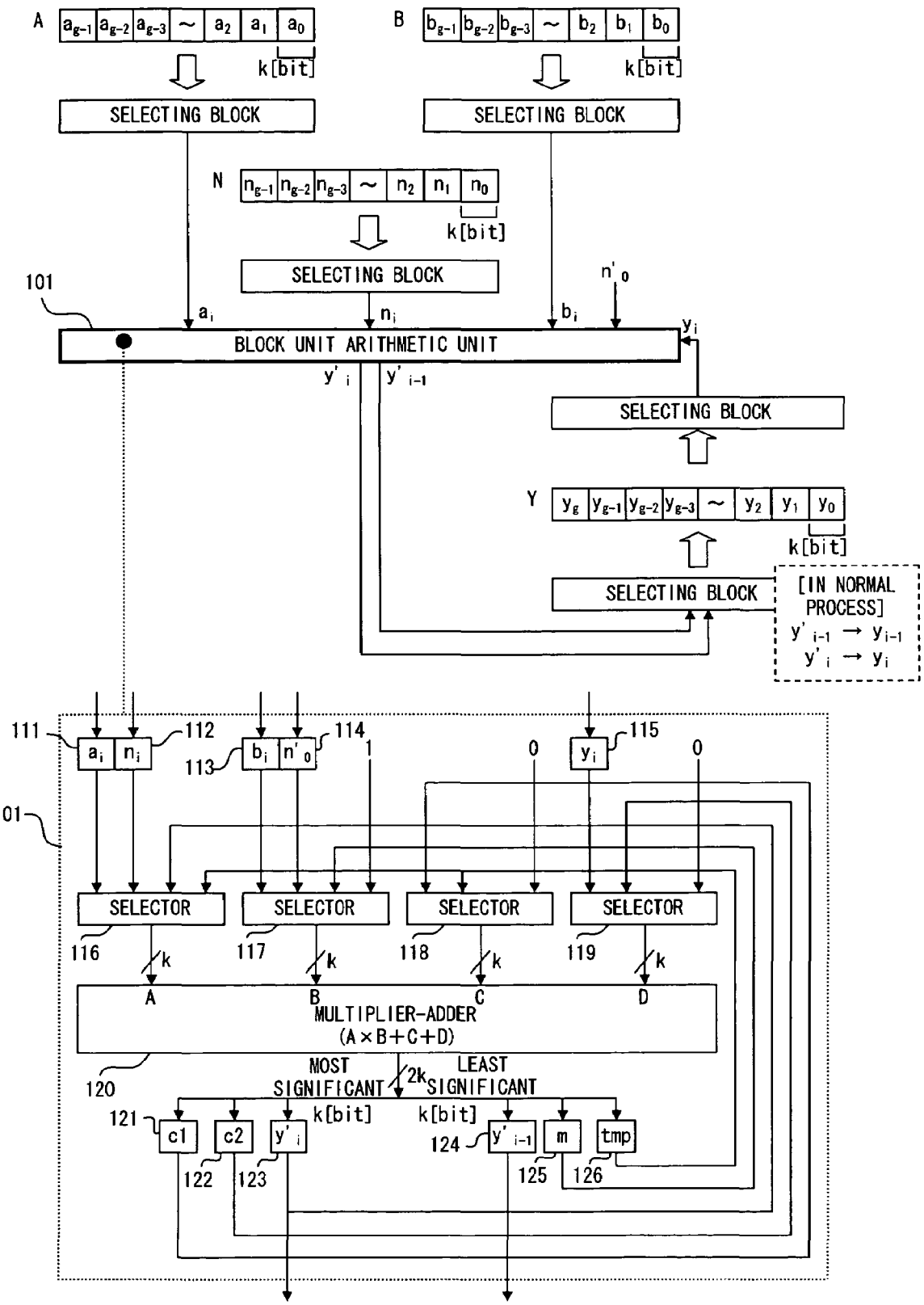
FIG. 1B shows a hypothetical multiplication residue arithmetic circuit.

The embodiments of the present invention are described below in detail by referring to the attached drawings.

FIG. 2A shows the principle of the arithmetic device according to the present invention. The arithmetic device shown in FIG. 2A comprises a partial product generation circuit 201, an encoder circuit 202, a selection circuit 203, and an addition circuit 204, and performs a multiplication of a multiplicand A and a multiplier B expressed by bit patterns.

The partial product generation circuit 201 generates a plurality of partial products from a multiplicand A in the secondary Booth algorithm. The encoder circuit 202 encodes a multiplier B based on the secondary Booth algorithm, and outputs a selection signal depending on the value of i specifying the three consecutive bits of $b_{2i+1}$, $b_{2i}$, and $b_{2i-1}$ of the multiplier B. The selection circuit 203 selects and outputs one of the plurality of partial products according to the selection signal. The addition circuit 204 adds up the partial products equal in number to i output from the selection circuit 203, and generates a multiplication result.

Then, the arithmetic unit has an operation mode in which the encoder circuit 202 outputs a selection signal for selection of a partial product indicating −A when i is 0, outputs a selection signal for selection of a partial product indicating 0 when i is a value other than 0, and the addition circuit 204 generates a two's complement of the multiplicand A from the partial product indicating −A, and outputs a two's complement of the multiplicand A as the multiplication result. In this operation mode, the addition circuit 204 can generate a one's complement of the multiplicand A instead of generating a two's complement of the multiplicand A from the partial product indicating −A.

The secondary Booth algorithm is known as an algorithm for reducing the number of partial products in the multiplication of A×B where A and B are integers of two's complements. The partial product generation circuit 201 generates from the multiplicand A a plurality of partial products indicating A, 2A, −A, −2A, and 0 based on the secondary Booth algorithm.

In the operation mode (complement mode described later), the encoder circuit 202 encodes the three consecutive bits $b_{2i+1}$, $b_{2i}$, and $b_{2i-1}$ of the multiplier B, generates a selection signal for selection of a partial product indicating −A for the three bits of $b_1$, $b_0$, and $b_{-1}$, and generates a selection signal for selection of a partial product indicating 0 for the three bits $b_{2i+1}$, $b_{2i}$, and $b_{2i-1}$ (i ≠0).

Thus, since the selection circuit 203 selects a partial product indicating −A for the three bits $b_1$, $b_0$, and $b_{-1}$, and selects a partial product indicating 0 for the other bits, the addition circuit 204 adds the partial product indicating −A to 0. Since −A is expressed by a two's complement of A or a one's complement of A, the multiplication result in the operation mode is a two's complement of A or a one's complement of A (=−A).

In the normal operation mode, the arithmetic unit can output a result of a multiplication of A×B. Thus, the process (6) shown in FIG. 1A can be performed without the inverter/non-inverter 141 shown in FIG. 1D by providing the operation mode in which −A is output as a multiplication result in the arithmetic device for performing a multiplication of A×B. When the arithmetic device is incorporated into the block unit arithmetic unit 131, the delay time in the block unit arithmetic unit 131 can be shortened, thereby improving the operation frequency.

The partial product generation circuit 201 shown in FIG. 2A corresponds to, for example, shift circuits 241 and 243, and an inverter 242 shown in FIG. 5 and described later, and the encoder circuit 202 shown in FIG. 2A corresponds to, for example, an encoder 247 shown in FIG. 5. The selection circuit 203 shown in FIG. 2A corresponds to, for example, a selection circuit 244 shown in FIG. 5, and the addition circuit 204 shown in FIG. 2A corresponds to, for example, a multi-stage addition circuit 245 shown in FIG. 5.

According to the present embodiment, the secondary Booth algorithm is adopted as an architecture of the multiplier-adder to have the inverter/non-inverter 141 on the maximum delay path <$n_i$→inverter/non-inverter 141→selector 116→multiplier-adder 120→(c1, c2, $y'_i$, $y'_{i-1}$, m, tmp)> of the block unit arithmetic unit 131 shown in FIG. 1D incorporated into the multiplier-adder 120. Thus, the delay time in the block unit arithmetic unit 131 can be shortened, thereby improving the operation frequency.

In the circuit shown in FIG. 1D, the size of the inverter/non-inverter 141 is proportional to the number k of bits of a block. Therefore, the larger the value of k, the more apparent the increment of the size of the circuit shown in FIG. 1B. However, according to the present invention, by incorporating the inverter/non-inverter 141 into the multiplier-adder 120, the algorithm shown in FIG. 1A can be realized with the substantially the same size as the circuit shown in FIG. 1B.

The secondary Booth algorithm reduces the number of partial products of the multiplication of A×B into q/2 in the following procedure when the multiplication of A×B, where A and B satisfy $-2^{q-1} \leq A$, $B \leq 2^{q-1}$ and are integers of two's complements of q bits, is performed with the bit representation of A and B defined respectively as $\{a_{q-1}, a_{q-2}, \ldots, a_1, a_0\}$ and $\{b_{q-1}, b_{q-2}, \ldots, b_1, b_0\}$.

The expression (1) which is a polynomial representation of B is transformed into the expression (2).

Furthermore, $d_i$ is defined as the bits which can represent −2, −1, 0, +1, and +2, and the expression (2) is represented by the expression (3).

$$-b_{q-1}2^{q-1}+b_{q-2}2^{q-2}+\ldots+b_1 2^1+b_0 2^0 \quad \text{expression (1)}$$

$$\Sigma((-2b_{2i+1}+b_{2i}+b_{2i-1})2^{2i}) \ *0 \leq i \leq q/2-1, \ b_{-1}=0 \quad \text{expression (2)}$$

$$\Sigma d_i 2^{2i}(*d_i = -2b_{2i+1}+b_{2i}+b_{2i-1}) \ *0 \leq i \leq q/2-1, \ b_{-1}=0 \quad \text{expression (3)}$$

It is necessary that q is an even number. However, even if q is an odd number, an amendment can be made by adding 1 to q and the secondary Booth algorithm can be applied. Also in the multiplication of A×B where A and B are integers of k bits and satisfy $0 \leq A$, $B \leq 2^{k-1}$, the secondary Booth algorithm can be applied with q=k+2, $a_{q-1}=a_{q-2}=b_{q-1}=b_{q-2}$ for an even number k, and with q=k+1, $a_{q-1}=b_{q-1}$ for an odd number k.

Figure 2B:
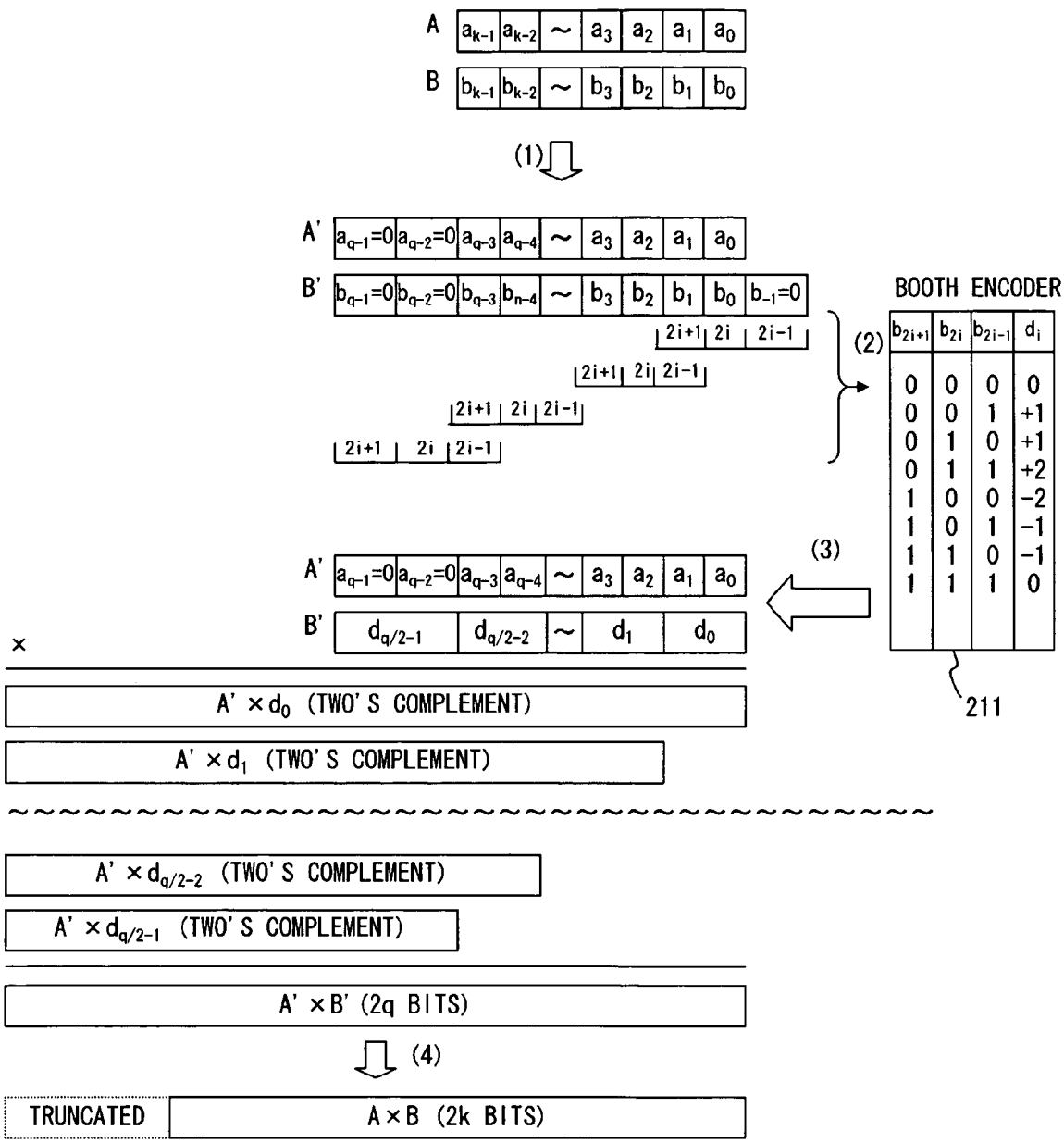
FIG. 2B shows an operation by a secondary Booth algorithm.

FIG. 2B shows the multiplication of A×B according to the secondary Booth algorithm where A and B satisfy $0 \leq A$, $B \leq 2^{k-1}$ and are integers of k bits. The operation in this case is as follows.

(1) A and B of k bits are amended to A' and B' of q bits. If k is an even number, q=k+2, $a_{q-1}=a_{q-2}=b_{q-1}=b_{q-2}$. If k is an odd number, q=k+1, $a_{q-1}=b_{q-1}$.

(2) The three bits $b_{2i+1}$, $b_{2i}$, and $b_{2i-1}$ where 0<i≦q/2−1 are encoded into $d_i$ using the Booth encoder 211.

(3) The multiplication of A'×B' is performed using $d_i$ obtained from $b_{2i+1}$, $b_{2i}$, and $b_{2i-1}$ as the bits of B' which can represent −2, −2, 0, +1, and +2. Each partial product in the multiplication is A'×$d_i$ (two's complement).

(4) The least significant 2k bits are segmented from the product A'×B' (2q bits) and set as a product A×B (2k bits)

FIG. 3 shows a multiplier obtained by adding a mode (complement mode) whose output is −A (two's complement) to the multiplier to which the secondary Booth algorithm is applied. In the multiplier shown in FIG. 3, a mode (normal mode) in which a normal multiplication of A×B is performed is switched to and from the complement mode.

In the complement mode, the output $d_0$ of Booth encoder 221 is −1, and the other outputs $d_i$ (i ≠0) are 0. Therefore, the partial product A'×$d_0$ is −A' (two's complement), and other partial products A'×$d_i$ (i ≠0) are 0. As a result, the output X of the multiplier is −A (two's complement). B in the complement mode refers to "don't care".

In this example, the partial product A'×$d_0$ is two's complement. Since a two's complement is obtained by adding 1 to a one's complement, 1 is added after the bit pattern is set as a one's complement (that is, by bit inversion) when the two's complement is realized in a circuit. However, when this operation is performed as is, it takes a long time in performing a partial product addition.

Then, the partial product A'×$d_0$ is defined as a one's complement, and a +1 addition for a two's complement is normally performed simultaneously with a partial product addition. $s_i$ of the Booth encoder 221 shown in FIG. 3 is used as an amendment value for realization of the +1 addition, $s_i=1$ when $d_i<0$, and $s_i=0$ when $d_i\geq 0$.

In the multiplier shown in FIG. 3, B in the complement mode refers to "don't care". However, when B=0 is input in the complement mode, the $d_i$ (i≠0) in the complement mode can be the same as the value in the normal mode.

Figure 4:
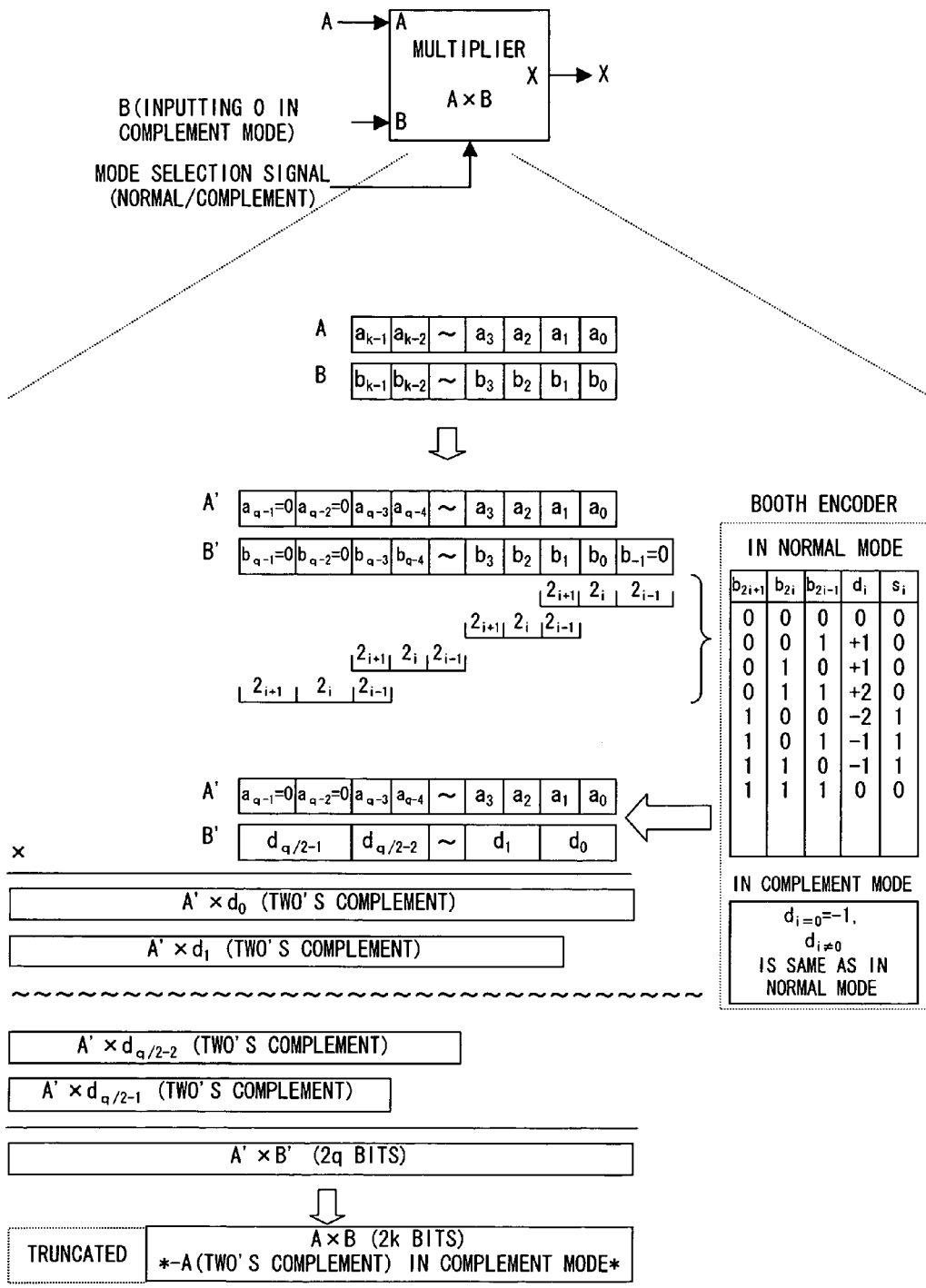
FIG. 4 shows a second multiplier.

FIG. 4 shows the above-mentioned multiplier. In the complement mode, the output $d_0$ of a Booth encoder 231 is −1, and the other outputs $d_i$ (i ≠0) are 0 which is the same as the output $d_i$ (i ≠0) in the normal mode where B=0. Therefore, the partial product A'×$d_0$ equals −A' (two's complement), and the other partial products A'×$d_i$ (i ≠0) are 0. Therefore, the output X of the multiplier is −A (two's complement)

Since the multiplier shown in FIG. 4 can have a smaller Booth encoder than the multiplier shown in FIG. 3, the optimum multiplier can be realized when it is easy to input B=0 at the side where a multiplier is used.

The multipliers shown in FIGS. 3 and 4 are configured by, for example, the circuit as shown in FIG. 5. The circuit shown in FIG. 5 comprises registers 240 and 246, the shift circuits 241 and 243, the inverter 242, the selection circuit 244, the multistage addition circuit 245, and the encoder 247. The encoder 247 corresponds to the Booth encoder 221 shown in FIG. 3 or the Booth encoder 231 shown in FIG. 4.

B' of the register 246 is divided into 2-bit sets, and a bit pair of each set is sequentially input to the encoder 247 with the most significant bit of a lower set. The encoder 247 generates a selection signal corresponding to $d_i$ from the three inputs $b_{2i+1}$, $b_{2i}$, and $b_{2i-1}$, and outputs it to the selection circuit 244 for selecting a multiple of A'.

The shift circuits 241 and 243 shifts the input bit pattern by 1 bit, and the inverter 242 inverts the input bit pattern. Using these circuits, four types of values, that is, an unchanged value (A'), 1-bit-shifted value (2A'), an inverted value (−A' (one's complement)), and a 1-bit-shifted value of an inverted value (−2A'), are generated from A' of the register 240, and input to the selection circuit 244.

The selection circuit 244 is provided corresponding to the output of each bit pair of the encoder 247, selects one of the four types of input values according to the selection signal from the encoder 247, and outputs the result as a partial product A'×$d_i$ to the multistage addition circuit 245. At this time, an amendment value $s_i$ is simultaneously output from the selection circuit 244. The multistage addition circuit 245 adds up the input partial product A'×$d_i$ and the amendment value $s_i$, and outputs the multiplication result X (=A×B).

In the multipliers shown in FIGS. 3 and 4, the output is −A (two's complement) by setting $d_0$=−1 and $s_0$=1 in the complement mode. However, if $s_0$=0, then the output can be −A (one's complement) As shown in FIG. 1C, although a two's complement is processed in the entire bit pattern in the multiple precision subtraction, a one's complement is processed in the block unit arithmetic. Therefore, it is important to set the output of the multiplier as −A (one's complement). In this case, the circuit for generating −A' corresponding to the partial product A'×$d_0$ is configured using an inverter 251 and an adding circuit 252 as shown in FIG. 6.

Figure 6:
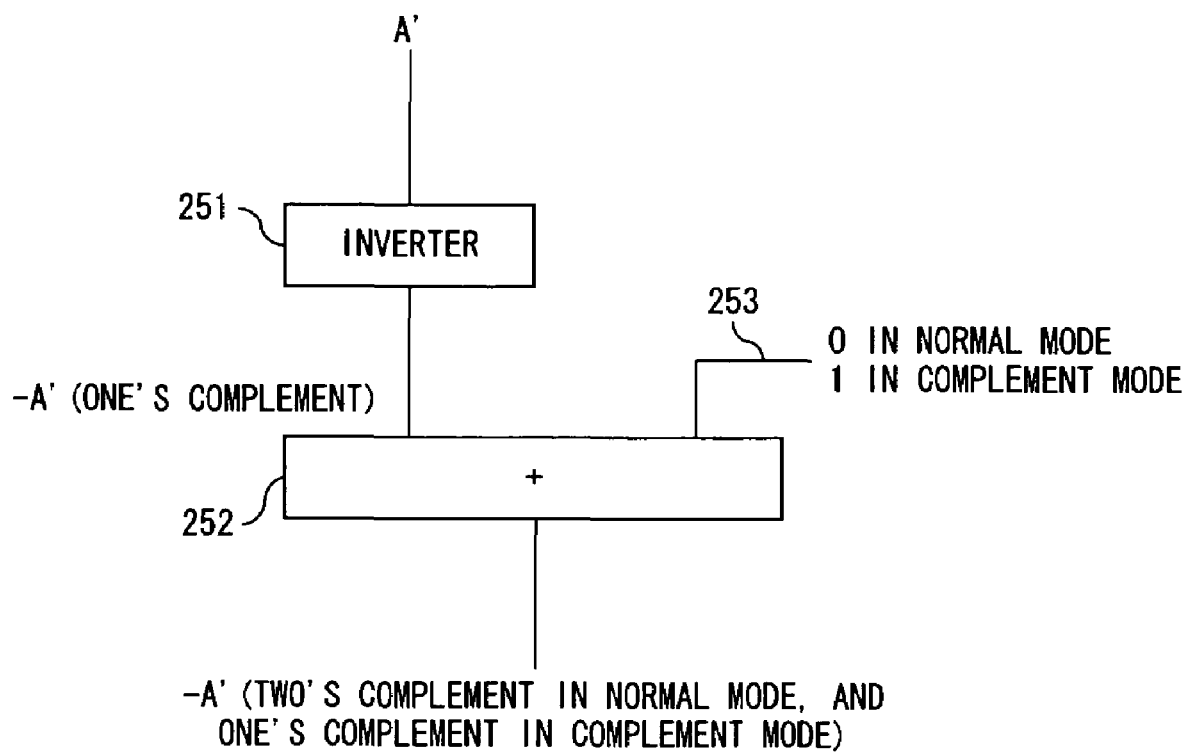
FIG. 6 shows a −A' generation circuit.

The inverter 251 shown in FIG. 6 inverts and outputs A', and the adding circuit 252 adds up the inverted A' and an amendment value 253, and outputs the sum. The amendment value 253 is 1 in the normal mode, and 0 in the complement mode. Therefore, −A' (two's complement) is output in the normal mode, and −A' (one's complement) is output in the complement mode.

The inverter 251 and the adding circuit 252 shown in FIG. 6 respectively correspond to the inverter 242 and multistage addition circuit 245 shown in FIG. 5, and the amendment value 253 corresponds to the amendment value $s_0$. With the configuration, different $s_0$ values are used between the normal mode and the complement mode.

The multiplier-adder of A×B+C+D for adding up the output of the multiplier shown in FIG. 5 and k-bit C and D where $0\leq C\leq 2^{k-1}-1$ and $0\leq D\leq 2^{k-1}-1$ is configured by the circuit shown in FIG. 7. In the circuit shown in FIG. 7, the multistage addition circuit 245 shown in FIG. 5 is replaced with a multistage addition circuit 261.

The multistage addition circuit 261 adds up the partial product and the amendment value from the selection circuit 244, and externally input C and D, and outputs a multiplication-addition result of X (=A×B+C+D). In the complement mode, X=−A (two's complement)+C+D.

However, if the configuration of the −A' generation circuit shown in FIG. 6 is adopted, the output in the complement mode is X=−A (one's complement)+C+D. In this case, the inverter 251 and the adding circuit 252 shown in FIG. 6 respectively correspond to the inverter 242 and the multistage addition circuit 261 shown in FIG. 7, and the amendment value 253 corresponds to the amendment value $s_0$.

Figure 8:
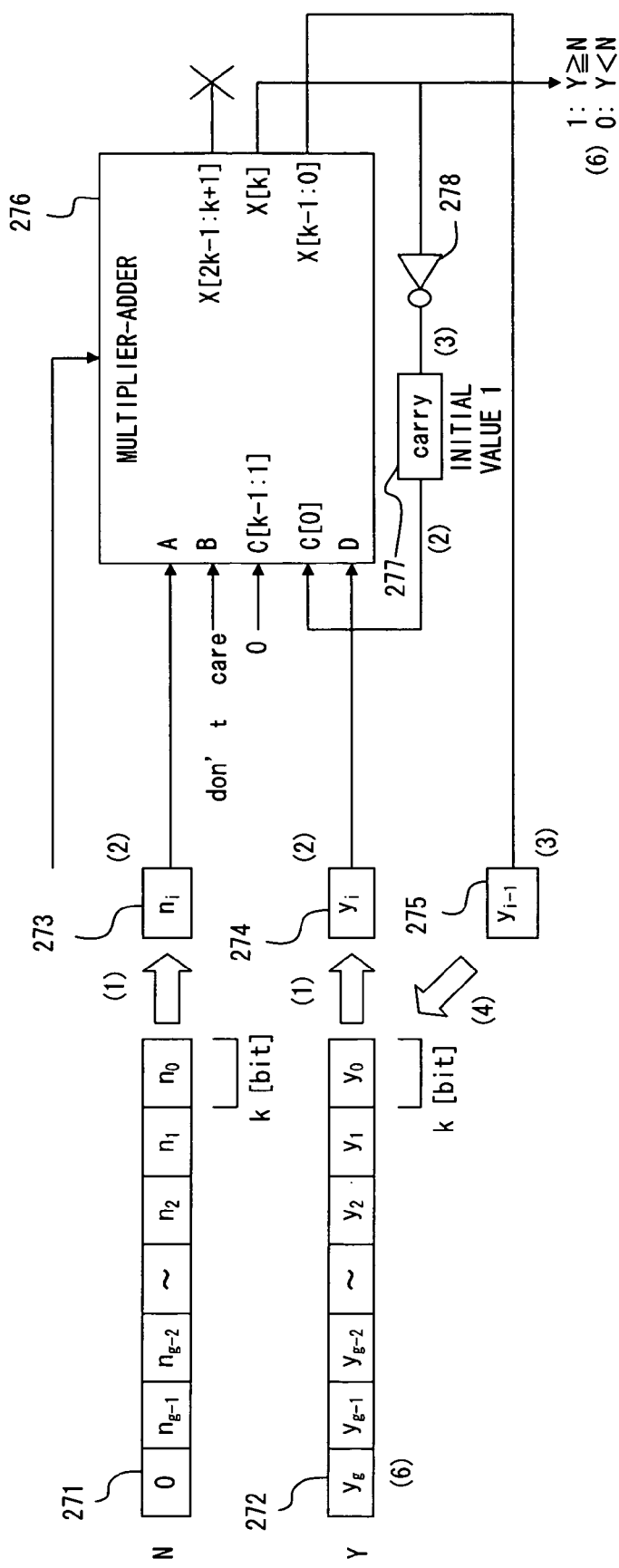
FIG. 8 shows a first multiple precision subtraction circuit.
Figure 9:
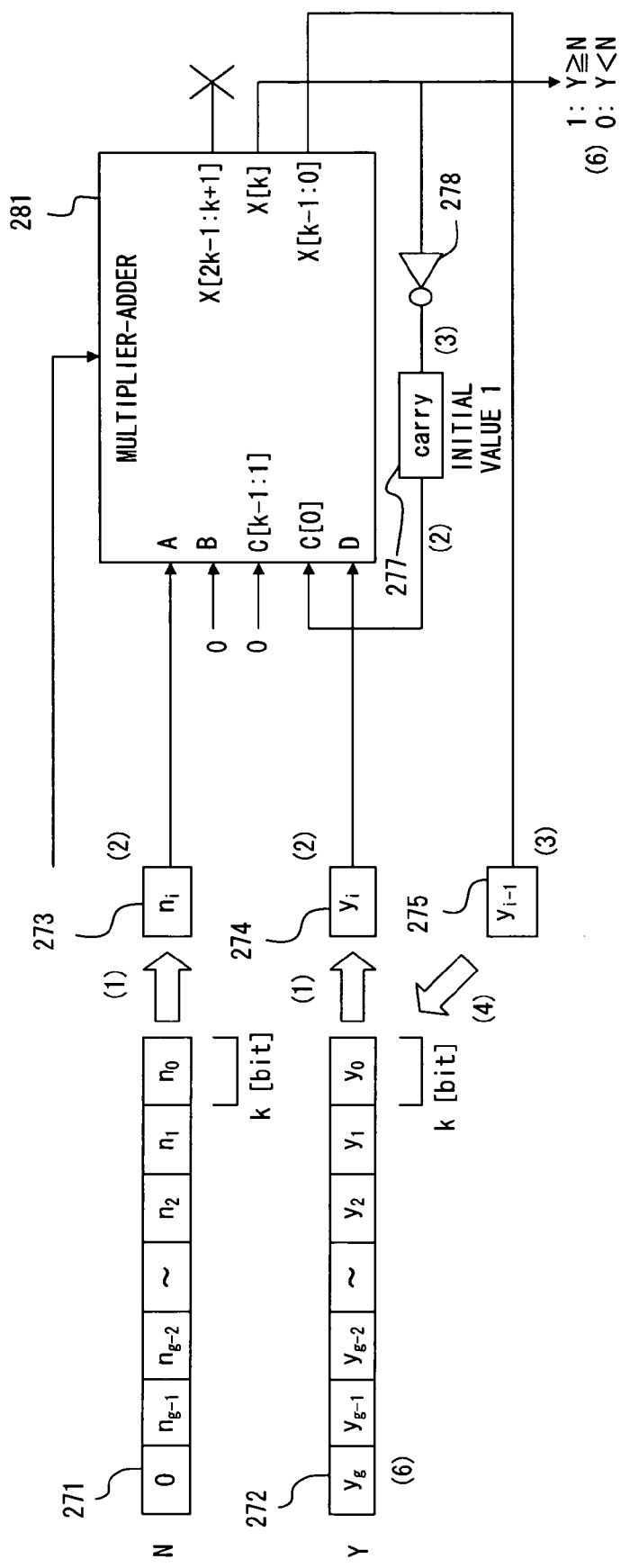
FIG. 9 shows a second multiple precision subtraction circuit.

FIGS. 8 and 9 show circuits for performing the multiple precision subtraction (Y=Y−N) shown in FIG. 1C using the multiplier-adder which outputs −A (one's complement)+C+D in the complement mode in FIG. 7. The multiple precision subtraction circuit shown in FIG. 8 comprises registers 271, 272, 273, 274, 275, and 277, a multiplier-adder 276, and an inverter 278. The multiple precision subtraction circuit shown in FIG. 9 comprises a multiplier-adder 281 replacing the multiplier-adder 276 in FIG. 8.

Since the multiplier-adder 276 shown in FIG. 8 performs a multiplication by the Booth encoder 221 shown in FIG. 3, the input B is "don't care". On the other hand, the multiplier-adder 281 shown in FIG. 9 performs a multiplication by the Booth encoder 231 shown in FIG. 4. Therefore, the input B is 0. Described below are the operations of the circuits shown in FIGS. 8 and 9.

(0) The value of the carry of the register 277 is initialized to 1.
(1) $n_i$ is selected from N in the register 271 and stored in the register 273, and $y_i$ is selected from Y in the register 272 and stored in the register 274.
(2) Assuming that the input is A=$n_i$, B=don't care, C[k−1:1]=0, C[0]=carry (carry from an arithmetic result in the (i−1)th block), and D=$y_i$, the multiplier-adder 276 performs the k-bit arithmetic X=−A (one's complement)+C+D in the complement mode.
  The multiplier-adder 281 performs the arithmetic of X=−A (one's complement)+C+D by assuming the input of A=$n_i$, B=0, C[k−1:1]=0, C[0]=carry, and D=$y_i$.
(3) In the output of the multiplier-adders 276 and 281, X[k−1:0] is stored in the register 275 as $y'_{i-1}$, X[k] is inverted by the inverter 278 and stored in the register 277. The carry stored in the register 277 becomes a carry to the (i+1)th block. X[k] is inverted because the carry of a complement is required as shown in FIG. 1C. X[2k−1:k+1] is not necessary and ignored.
(4) $y'_{i-1}$ of the register 275 is stored in the register 272 as $y_i$.
(5) The operations (1) through (4) are repeated in the range of 0<i<g.
(6) When the operation (5) is completed, Y in the register 272 stores the arithmetic result of Y−N. The arithmetic result X[k] of the g-th block indicates the sign (1: Y≧N, 0: Y<N) of Y=Y−N.

Figure 10:
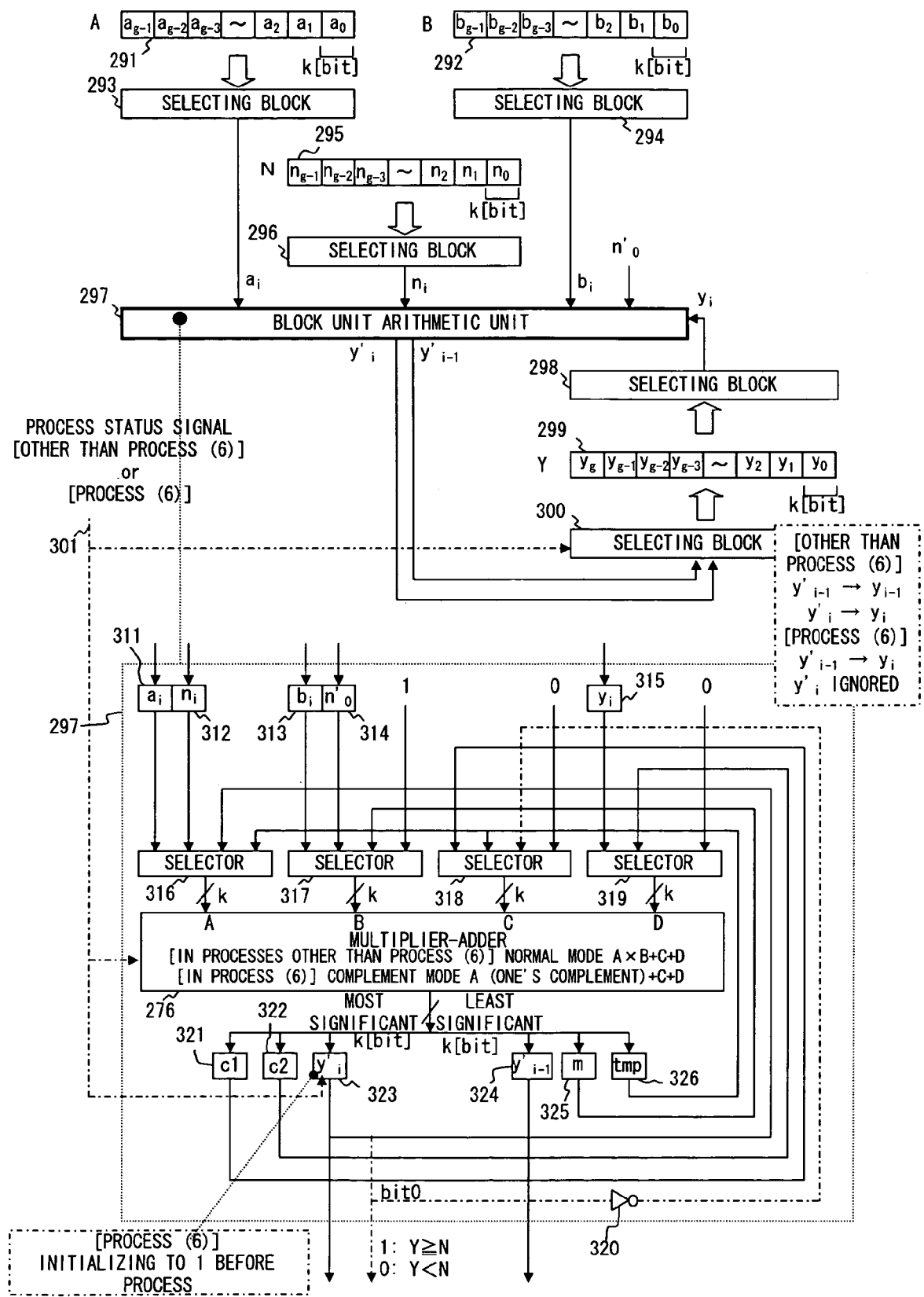
FIG. 10 shows a first multiple precision arithmetic circuit.

FIGS. 10 and 11 show the circuits for performing a multiple precision arithmetic (Y=AB$2^{-kg}$ mod N) for Montgomery multiplication residue arithmetic using the multiplier-adder which outputs −A (one's complement)+C+D in the complement mode in FIG. 7. The multiple precision arithmetic circuit shown in FIG. 10 comprises registers 291, 292, 295, and 299, block selection circuits 293, 294, 296, 298, and 300, and a block unit arithmetic unit 297. The multiple precision arithmetic circuit shown in FIG. 11 has the configuration including a block unit arithmetic unit 331 replacing the block unit arithmetic unit 297 in FIG. 10.

In FIG. 10, the registers 291, 292, and 295 respectively store A, B, and N each of which is divided into g blocks. The block selection circuits 293, 294, and 296 respectively select the blocks $a_i$, $b_i$, and $n_i$ of A, B, and N, and output them to the block unit arithmetic unit 297. The block selection circuit 298 selects the block $y_i$ of Y from the register 299, and outputs it to the block unit arithmetic unit 297.

The block unit arithmetic unit 297 receives the blocks $a_i$, $b_i$, $n_i$, $n'_0$, and $y_i$, performs an operation, and outputs arithmetic results $y'_i$ and $y'_{i-1}$. The block selection circuit 300 selects $y'_i$ or $y'_{i-1}$, and stores the selection result in the register 299 as a block $y_i$ or $y_{i-1}$ The multiple precision arithmetic circuit shown in FIG. 11 performs a similar process.

As shown at the lower portion in FIG. 10, the block unit arithmetic unit 297 comprises registers 311, 312, 313, 314, 315, 321, 322, 323, 324, 325, and 326, selectors 316, 317, 318, and 319, a multiplier-adder 276, and an inverter 320. The block unit arithmetic unit 331 shown in FIG. 11 has a configuration in which the multiplier-adder 281 is used instead of the multiplier-adder 276 shown in FIG. 10 and a selector 332 is added.

In the circuit shown in FIGS. 10 and 11, the process (normal process) other than the process (6) of the algorithm shown in FIG. 12 and the process (6) (last process) are switched by a process status signal 301. The multiplier-adder 276 and 281 perform the operation in the normal mode (X=A×B+C+D) in the normal process, and perform the operation in the complement mode (X=−A (one's complement)+C+D) in the last process. The selector 332 shown in FIG. 11 selects the input 1 in the normal process, selects the input 0 in the last process, and outputs the selection result to the multiplier-adder 281.

Since the operation corresponding to the normal process of the circuits shown in FIGS. 10 and 11 is the same as that of the circuit shown in FIG. 1B, only the operation corresponding to the last process is described below. The operations corresponding to the process (6) of the circuit shown in FIGS. 10 and 11 are described below.

(0) The value of $y'_i$ of the register 323 is initialized to 1, and the multiplier-adder 276 and 281 are put in the complement mode.

(1) $n_i$ is selected from N of the register 295 and stored in the register 312, and $y_i$ is selected from Y of the register 299 and stored in the register 315.

(2) The selectors 316, 318, and 319 respectively select A=$n_i$, C=the value obtained by inverting the bit 0 of $y'_i$ by the inverter 320 (carry from the arithmetic result of the (i−1)th block), and D=$y_i$.

At this time, in the circuit shown in FIG. 10, the output B of the selector 317 is "don't care". On the other hand, in the circuit shown in FIG. 11, the selector 332 selects the input 0, and the selector 317 selects the output of the selector 332, thereby selecting B=0 after all.

The multiplier-adder 276 and multiplier-adder 281 perform the k-bit operation X=−A (one's complement)+C+D in the complement mode.

(3) In the outputs of the multiplier-adder 276 and 281, X[k−1:0] is stored in the register 324 as $y'_{i-1}$, and X[2k−1:k] is stored in the register 323 as $y'_i$. The bit 0 (X[k]) of $y'_i$ stored in the register 323 is inverted by the inverter 320, and is used as a carry to the (i+1)th block.

(4) $y'_{i-1}$ of the register 324 is stored in the register 299 as $y_i$. Since the bits other than the bit 0 of $y'_i$ of the register 323 are not required, they are ignored.

(5) The operations (1) through (4) are repeated in the range of 0<i<g.

(6) When the operation (5) is completed, Y of the register 299 stores the arithmetic result of Y−N. The bit 0 of $y'_g$ stored in the register 323 indicates the sign (1: Y≧N, 0: Y<N) of Y=Y−N.

According to the present invention, the circuit required in performing a multiple precision subtraction for Montgomery multiplication residue arithmetic can be incorporated into a multiplier-adder, and a multiple precision arithmetic algorithm for Montgomery multiplication residue arithmetic can be realized by hardware smaller than in a conventional circuit.

Furthermore, since the delay time of a circuit can be shortened by incorporating a circuit required in performing a multiple precision subtraction into a multiplier-adder, an operation can be performed at an operation frequency higher than in the conventional circuit.

The multiple precision arithmetic algorithm for Montgomery multiplication residue arithmetic requires a large amount of computation in the operation performed by the RSA cryptography and the elliptical curve cryptography, and the present invention can largely contribute to a high-speed performance in these cryptographic processes.

What is claimed is:

1. An arithmetic circuit which performs a multiplication of a multiplicand A and a multiplier B expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i;

a selection circuit to select and output one of the plurality of partial products according to the selection signal;

an addition circuit to add up partial products specified by the value of i output from the selection circuit, and generate a multiplication result; and a storage storing the result used for cryptography, and wherein said arithmetic device has an operation mode in which said encoder circuit outputs a selection signal for selection of a partial product indicating −A when i is 0, and outputs a selection signal for selection of a partial product indicating 0 when i is a value other than 0, and said addition circuit generates a two's complement of the multiplicand A from the partial product indicating A, and outputs the two's complement of the multiplicand A as the result.

2. An arithmetic circuit which performs a multiplication of a multiplicand A and a multiplier B expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i;

a selection circuit to select and output one of the plurality of partial products according to the selection signal;

an addition circuit to add up partial products specified by the value of i output from the selection circuit, and generate a multiplication result; and a storage storing the result used for cryptography, and wherein said arithmetic device has an operation mode in which said encoder circuit outputs a selection signal for selection of a partial product indicating −A when i is 0, and outputs a selection signal for selection of a partial product indicating 0 when i is a value other than 0, and said addition circuit generates a one's complement of the multiplicand A from the partial product indicating −A, and outputs the one's complement of the multiplicand A as the result.

3. The circuit according to claim 2, wherein said encoder circuit outputs a selection signal for selection of a partial product indicating 0 when i is a value other than 0 regardless of a value of the multiplier B in the operation mode.

4. The circuit according to claim 2, wherein said encoder circuit outputs a selection signal for selection of a partial product indicating 0 when i is a value other than 0 and when 0 is input as the multiplier B in the operation mode.

5. An arithmetic circuit which performs a multiplication-addition by performing a multiplication of a multiplicand A and a multiplier B expressed by bit patterns and then adding up a multiplication result, a number C, and a number D expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i;

a selection circuit to select and output one of the plurality of partial products according to the selection signal;

an addition circuit to add up partial products specified by the value of i output from said selection circuit, the number C, and the number D, and generating a multiplication-addition result; and a storage storing the result used for cryptography, and wherein said arithmetic device has operation mode in which said encoder circuit outputs a selection signal for selection of a partial product indicating −A when i is 0, and outputs a selection signal for selection of a partial product indicating 0 when i is a value other than 0, and said addition circuit generates a one's complement of the multiplicand A from the partial product indicating −A, and outputs a result of adding up the one's complement of the multiplicand A, the number C, and the number D as the result.

6. An arithmetic circuit which performs an operation of subtracting an integer N containing g k-bit blocks from an integer Y containing g+1 k-bit blocks by performing a multiplication of a multiplicand A and a multiplier B expressed by k-bit bit patterns and then adding up a multiplication result, a number C, and a number D expressed by k-bit bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of specifying three consecutive bits $b_{2i+1}$, $b_{2i}$, and $b_{2i-1}$ of the multiplier B specified by the value of i;

a selection circuit to select and output one of the plurality of partial products according to the selection signal;

an addition circuit to add up partial products specified by the value of i output from said selection circuit, the number C, and the number D, and generate a 2k-bit multiplication-addition result;

an inverter to invert a part of bits of the multiplication-addition result; and a storage storing the result used for cryptography, and wherein said partial product generation circuit uses a j-th block $n_j$ of the integer N as the multiplicand A, said encoder circuit outputs a selection signal for selection of a partial product indicating −A when i is 0, and outputs a selection signal for selection of a partial product indicating 0 when i is a value other than 0, said addition circuit generates a one's complement of the multiplicand A from the partial product indicating −A, and outputs a result of adding up the one's complement of the multiplicand A, the number C, and the number D as a multiplication-addition result of a j-th block using a carry from a multiplication-addition of a (j−1)th block as the number C and a j-th block $y_j$ of the integer Y as the number D, and said inverter inverts a part of bits of the multiplication-addition result of the j-th block, and generates a carry to a multiplication-addition of a (j+1)th block.

7. An arithmetic circuit which divides integers I and J and a modulus N of residue arithmetic expressed by bit patterns, into g k-bit blocks, respectively and performs multiple precision arithmetic for Montgomery multiplication residue arithmetic of Y=IJ2$^{-kg}$ mod N, comprising:

a first selection circuit to select and output one of a plurality of given values for each of a k-bit multiplicand A, multiplier B, number C, and number D;

a partial product generation circuit to generate a plurality of partial products in a secondary Booth algorithm from the multiplicand A output from said first selection circuit;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B output from said first selection circuit and specified by the value of i;

a second selection circuit to select and output one of the plurality of partial products according to the selection signal;

an addition circuit to add up partial products specified by the value of i output from said second selection circuit, the number C, and the number D output from said first selection circuit, and to generate a 2k-bit multiplication-addition result;

an inverter to invert a part of bits of the multiplication-addition result; and a storage storing the result used for cryptography, and wherein said arithmetic device has an operation mode in which said first selection circuit selects a j-th block $n_j$ of the integer N as the multiplicand A, selects a carry from a multiplication-addition of a (j−1)th block as the number C, and selects a j-th block $y_j$ as the number D, said encoder circuit outputs a selection signal for selection of a partial product indicating −A when i is 0, and outputs a selection signal for selection of a partial product indicating 0 when i is a value other than 0, said addition circuit generates a one's complement of the multiplicand A from the partial product indicating −A, and outputs a result of adding up the one's complement of the multiplicand A, the number C, and the number D as a multiplication-addition result of a j-th block, and said inverter inverts a part of bits of the multiplication-addition result of the j-th block, and generates a carry to a multiplication-addition of a (j+1)th block.

8. An arithmetic circuit which performs a multiplication of a multiplicand A and a multiplier B expressed by bit patterns, comprising:
partial product generation means for generating a plurality of partial products in a secondary Booth algorithm from the multiplicand A;
encoder means for encoding the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i;
selection means for selecting and outputting one of the plurality of partial products according to the selection signal;
addition means for adding up partial products specified by the value of i output from said selection means, and generating a multiplication result; and
a storage storing the result used for cryptography, and
wherein said arithmetic device has an operation mode in which said encoder means outputs a selection signal for selection of a partial product indicating −A when i is 0, and outputs a selection signal for selection of a partial product indicating 0 when i is a value other than 0, and said addition means generates a two's complement of the multiplicand A from the partial product indicating −A, and outputs the two's complement of the multiplicand A as the result.

9. An arithmetic circuit which performs a multiplication of a multiplicand A and a multiplier B expressed by bit patterns, comprising:
partial product generation means for generating a plurality of partial products in a secondary Booth algorithm from the multiplicand A;
encoder means for encoding the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i;
selection means for selecting and outputting one of the plurality of partial products according to the selection signal;
addition means for adding up partial products specified by the value of i output from said selection means, and generating a multiplication result; and
a storage storing the result used for cryptography, and
wherein said arithmetic device has an operation mode in which said encoder means outputs a selection signal for selection of a partial product indicating −A when i is 0, and outputs a selection signal for selection of a partial product indicating 0 when i is a value other than 0, and said addition means generates a one's complement of the multiplicand A from the partial product indicating A, and outputs the one's complement of the multiplicand A as the result.

10. An arithmetic circuit which performs a multiplication-addition by performing a multiplication of a multiplicand A and a multiplier B expressed by bit patterns and then adding up a multiplication result, a number C, and a number D expressed by bit patterns, comprising:
partial product generation means for generating a plurality of partial products in a secondary Booth algorithm from the multiplicand A;
encoder means for encoding the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i;
selection means for selecting and outputting one of the plurality of partial products according to the selection signal;
addition means for adding up partial products specified by the value of i output from the selection means, the number C, and the number D, and generating a multiplication-addition result; and
a storage storing the result used for cryptography, and
wherein said arithmetic device has an operation mode in which said encoder means outputs a selection signal for selection of a partial product indicating −A when i is 0, and outputs a selection signal for selection of a partial product indicating 0 when i is a value other than 0, and said addition means generates a one's complement of the multiplicand A from the partial product indicating −A, and outputs a result of adding up the one's complement of the multiplicand A, the number C, and the number D as the result.

11. An arithmetic circuit which performs an operation of subtracting an integer N containing g k-bit blocks from an integer Y containing g+1 k-bit blocks by performing a multiplication of a multiplicand A and a multiplier B expressed by k-bit bit patterns and then adding up a multiplication result, a number C, and a number D expressed by k-bit bit patterns, comprising:
partial product generation means for generating a plurality of partial products in a secondary Booth algorithm from the multiplicand A;
encoder means for encoding the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i;
selection means for selecting and outputting one of the plurality of partial products according to the selection signal;
addition means for adding up partial products specified by the value of i output from said selection means, the number C, and the number D, and generating a 2k-bit multiplication-addition result;
inverter means for inverting a part of bits of the multiplication-addition result; and
a storage storing the result used for cryptography, and
wherein said partial product generation means uses a j-th block $n_j$ of the integer N as the multiplicand A, said encoder means outputs a selection signal for selection of a partial product indicating −A when i is 0, and outputs a selection signal for selection of a partial product indicating 0 when i is a value other than 0, said addition means generates a one's complement of the multiplicand A from the partial product indicating −A, and outputs a result of adding up the one's complement of the multiplicand A, the number C, and the number D as a multiplication-addition result of a j-th block using a carry from a multiplication-addition of a (j−1)th block as the number C and a j-th block $y_j$ of the integer Y as the number D, and said inverter means inverts a part of bits of the multiplication-addition result of the j-th block, and generates a carry to a multiplication-addition of a (j+1)th block.

12. An arithmetic circuit which divides integers I and J and a modulus N of residue arithmetic expressed by bit patterns, into g k-bit blocks, respectively and performs multiple precision arithmetic for Montgomery multiplication residue arithmetic of $Y=IJ2^{-kg}$ mod N, comprising:

first selection means for selecting and outputting one of a plurality of given values for each of a k-bit multiplicand A, multiplier B, number C, and number D;

partial product generation means for generating a plurality of partial products in a secondary Booth algorithm from the multiplicand A output from said first selection means;

encoder means for encoding the multiplier B based on the secondary Booth algorithm, and outputting a selection signal depending on a value of i specifying three consecutive bits $b_{2i+1}$, $b_{2i}$, and $b_{2i-1}$ of the multiplier B output from said first selection means and specified by the value of i;

second selection means for selecting and outputting one of the plurality of partial products according to the selection signal;

addition means for adding up partial products specified by the value of i output from said second selection means, the number C, and the number D output from said first selection means, and generating a 2k-bit multiplication-addition result;

inverter means for inverting a part of bits of the multiplication-addition result; and a storage storing the result used for cryptography, and wherein said arithmetic device has an operation mode in which said first selection means selects a j-th block $n_j$ of the integer N as the multiplicand A, selects a carry from a multiplication-addition of a (j−1)th block as the number C, and selects a j-th block $y_j$ as the number D, said encoder means outputs a selection signal for selection of a partial product indicating −A when i is 0, and outputs a selection signal for selection of a partial product indicating 0 when i is a value other than 0, said addition means generates a one's complement of the multiplicand A from the partial product indicating −A, and outputs a result of adding up the one's complement of the multiplicand A, the number C, and the number D as a multiplication-addition result of a j-th block, and said inverter means inverts a part of bits of the multiplication-addition result of the j-th block, and generates a carry to a multiplication-addition of a (j+1)th block.

13. An arithmetic method for performing a multiplication of a multiplicand A and a multiplier B expressed by bit patterns, comprising:

generating a plurality of partial products in a secondary Booth algorithm from the multiplicand A;

encoding by an encoder circuit the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i, wherein outputting a selection signal for selection of a partial product indicating −A when i is 0, and outputting a selection signal for selection of a partial product indicating 0 when i is a value other than 0;

selecting and outputting one of the plurality of partial products according to the selection signal;

adding up partial products specified by the value of i output by said selecting operation, and generating a multiplication result, wherein the arithmetic method generating a two's complement of the multiplicand A from the partial product indicating −A, and outputting the two's complement of the multiplicand A as the result; and storing the result in a storage used for cryptography.

14. An arithmetic method for performing a multiplication of a multiplicand A and a multiplier B expressed by bit patterns, comprising:

generating a plurality of partial products in a secondary Booth algorithm from the multiplicand A;

encoding by an encoder circuit the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i, wherein outputting a selection signal for selection of a partial product indicating −A when i is 0, and outputting a selection signal for selection of a partial product indicating 0 when i is a value other than 0;

selecting and outputting one of the plurality of partial products according to the selection signal;

adding up partial products specified by the value of i output by said selecting operation, and generating a multiplication result, wherein the arithmetic method generating a one's complement of the multiplicand A from the partial product indicating −A, and outputting the one's complement of the multiplicand A as the result; and storing the result in a storage used for cryptography.

15. An arithmetic method for performing a multiplication-addition by performing a multiplication of a multiplicand A and a multiplier B expressed by bit patterns and then adding up a multiplication result, a number C, and a number D expressed by bit patterns, comprising:

generating a plurality of partial products in a secondary Booth algorithm from the multiplicand A;

encoding by an encoder circuit the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i, wherein outputting a selection signal for selection of a partial product indicating −A when i is 0, and outputting a selection signal for selection of a partial product indicating 0 when i is a value other than 0;

selecting and outputting one of the plurality of partial products according to the selection signal;

adding up partial products specified by the value of i output by said selecting operation, the number C, and the number D, and generating a multiplication-addition result, wherein the arithmetic method generating a one's complement of the multiplicand A from the partial product indicating −A, and outputting a result of adding up the one's complement of the multiplicand A, the number C, and the number D as the result; and storing the result in a storage used for cryptography.

16. An arithmetic method for performing an operation of subtracting an integer N containing g k-bit blocks from an integer Y containing g+1 k-bit blocks by performing a multiplication of a multiplicand A and a multiplier B expressed by k-bit bit patterns and then adding up a multiplication result, a number C, and a number D expressed by k-bit bit patterns, comprising:

generating a plurality of partial products in a secondary Booth algorithm from the multiplicand A by using a j-th block $n_j$ of the integer N as the multiplicand A;

encoding by an encoder circuit the multiplier B based on the secondary Booth algorithm, and outputting a selection signal depending on a value of i specifying three consecutive bits $b_{2i+1}$, $b_{2i}$, and $b_{2i-1}$ of the multiplier B specified by the value of i, wherein outputting a selection signal for selection of a partial product indicating −A when i is 0, and outputting a selection signal for selection of a partial product indicating 0 when i is a value other than 0;

selecting and outputting one of the plurality of partial products according to the selection signal;

adding up partial products specified by the value of i output by said selecting operation, the number C, and the number D, and generating a 2k-bit multiplication-addition result, wherein the arithmetic method generating a one's complement of the multiplicand A from the partial product indicating −A, and outputting a result of adding up the one's complement of the multiplicand A, the number C, and the number D as a multiplication-addition result of a j-th block using a carry from a multiplication-addition of a (j−1)th block as the number C and a j-th block $y_j$ of the integer Y as the number D;

inverting a part of bits of the multiplication-addition result, wherein inverting a part of bits of the multiplication-addition result of the j-th block, and generating a carry to a multiplication-addition of a (j+1)th block; and storing the result in a storage used for cryptography.

17. An arithmetic method for dividing integers I and J and a modulus N of residue arithmetic expressed by bit patterns, into g k-bit blocks, respectively and performing multiple precision arithmetic for Montgomery multiplication residue arithmetic of $Y=IJ2^{-kg}$ mod N, comprising:

first selecting and outputting one of a plurality of given values for each of a k-bit multiplicand A, multiplier B, number C, and number D, wherein selecting a j-th block $n_j$ of the integer N as the multiplicand A, selecting a carry from a multiplication-addition of a (j−1)th block as the number C, and selecting a j-th block $y_j$ the number D;

generating a plurality of partial products in a secondary Booth algorithm from the multiplicand A output by said first selecting operation;

encoding by an encoder circuit the multiplier B based on the secondary Booth algorithm, and outputting a selection signal depending on a value of i specifying three consecutive bits $b_{2i+1}$, $b_{2i}$, and $b_{2i-1}$ of the multiplier B output by said first selecting operation and specified by the value of i, wherein outputting a selection signal for selection of a partial product indicating −A when i is 0, and outputting a selection signal for selection of a partial product indicating 0 when i is a value other than 0;

second selecting and outputting one of the plurality of partial products according to the selection signal;

adding up partial products specified by the value of i output by said second selecting operation, the number C, and the number D output by said first selecting operation, and generating a 2k-bit multiplication-addition result, wherein the arithmetic method generating a one's complement of the multiplicand A from the partial product indicating −A, and outputting a result of adding up the one's complement of the multiplicand A, the number C, and the number D as a multiplication-addition result of a j-th block;

inverting a part of bits of the multiplication-addition result wherein inverting a part of bits of the multiplication-addition result of the j-th block, and generating a carry to a multiplication-addition of a (j+1)th block; and storing the result in a storage used for cryptography.

18. An arithmetic circuit which performs a multiplication of a multiplicand A and a multiplier B expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i;

a selection circuit connected to the partial product generation circuit and the encoder circuit to select and output one of the plurality of partial products according to the selection signal;

an addition circuit connected to the selection circuit to add up partial products specified by the value of i output from the selection circuit, and generate a multiplication result; and a storage connected to the addition circuit and storing the result, and wherein said arithmetic device has an operation mode in which said encoder circuit outputs a selection signal for selection of a partial product indicating −A when i is 0, and outputs a selection signal for selection of a partial product indicating 0 when i is a value other than 0, and said addition circuit generates a two's complement of the multiplicand A from the partial product indicating A, and outputs the two's complement of the multiplicand A as the result.

19. An arithmetic circuit which performs a multiplication of a multiplicand A and a multiplier B expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of a selection circuit connected to the partial product generation circuit and the encoder circuit to select and output one of the plurality of partial products according to the selection signal;

an addition circuit connected to the selection circuit to add up partial products specified by the value of i output from the selection circuit, and generate a multiplication result; and a storage connected to the addition circuit and storing the result, and wherein said arithmetic device has an operation mode in which said encoder circuit outputs a selection signal for selection of a partial product indicating −A when i is 0, and outputs a selection signal for selection of a partial product indicating 0 when i is a value other than 0, and said addition circuit generates a one's complement of the multiplicand A from the partial product indicating −A, and outputs the one's complement of the multiplicand A as the result.

20. An arithmetic circuit which performs a multiplication-addition by performing a multiplication of a multiplicand A and a multiplier B expressed by bit patterns and then adding up a multiplication result, a number C, and a number D expressed by bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i; a selection circuit connected to the partial product generation circuit and the encoder circuit to select and output one of the plurality of partial products according to the selection signal;

an addition circuit connected to the selection circuit to add up partial products specified by the value of i output from said selection circuit, the number C, and the number D, and generating a multiplication-addition result; and a storage connected to the addition circuit and storing the result, and wherein said arithmetic device has an operation mode in which said encoder circuit outputs a selection signal for selection of a partial product indicating −A when i is 0, and outputs a selection signal for selection of a partial product indicating 0 when i is a value other than 0, and said addition circuit generates a one's complement of the multiplicand A from the partial product indicating −A, and outputs a result of adding up the one's complement of the multiplicand A, the number C, and the number D as the result.

21. An arithmetic circuit which performs an operation of subtracting an integer N containing g k-bit blocks from an integer Y containing g+1 k-bit blocks by performing a multiplication of a multiplicand A and a multiplier B expressed by k-bit bit patterns and then adding up a multiplication result, a number C, and a number D expressed by k-bit bit patterns, comprising:

a partial product generation circuit to generate a plurality of partial products in a secondary Booth algorithm from the multiplicand A;

an encoder circuit to encode the multiplier B based on the secondary Booth algorithm, and output a selection signal depending on a value of i specifying three consecutive bits $b_{2i+1}$, $b_{2i}$, and $b_{2i-1}$ of the multiplier B specified by the value of i;

a selection circuit connected to the partial product generation circuit and the encoder circuit to select and output one of the plurality of partial products according to the selection signal;

an addition circuit connected to the selection circuit to add up partial products specified by the value of i output from said selection circuit, the number C, and the number D, and generate a 2k-bit multiplication-addition result;

an inverter connected to the selection circuit to invert a part of bits of the multiplication-addition result; and a storage connected to the addition circuit and the inverter and storing the result, and wherein said partial product generation circuit uses a j-th block $n_j$ of the integer N the multiplicand A, said encoder circuit outputs a selection signal for selection of a partial product indicating −A when i is 0, and outputs a selection signal for selection of a partial product indicating 0 when i is a value other than 0, said addition circuit generates a one's complement of the multiplicand A from the partial product indicating −A, and outputs a result of adding up the one's complement of the multiplicand A, the number C, and the number D as a multiplication-addition result of a j-th block using a carry from a multiplication-addition of a (j−1)th block as the number C and a j-th block $y_j$ of the integer Y as the number D, and said inverter inverts a part of bits of the multiplication-addition result of the j-th block, and generates a carry to a multiplication-addition of a (j+1)th block.

22. An arithmetic circuit which divides integers I and J and a modulus N of residue arithmetic expressed by bit patterns, into g k-bit blocks, respectively and performs multiple precision arithmetic for Montgomery multiplication residue arithmetic of $Y = IJ2^{-kg} \bmod N$, comprising:

a first selection circuit to select and output one of a plurality of given values for each of a k-bit multiplicand A, multiplier B, number C, and number D;

a partial product generation circuit connected to the first selection circuit to generate a plurality of partial products in a secondary Booth algorithm from the multiplicand A output from said first selection circuit;

an encoder circuit connected to the first selection circuit to encode the multiplier B based on the secondary Booth algorithm, and output a selection signal depending on a value of i specifying three consecutive bits $b_{2i+1}$, $b_{2i}$, and $b_{2i-1}$ of the multiplier B output from said first selection circuit and specified by the value of i;

a second selection circuit connected to the partial product generation circuit and the encoder circuit to select and output one of the plurality of partial products according to the selection signal;

an addition circuit connected to the selection circuit to add up partial products specified by the value of i output from said second selection circuit, the number C, and the number D output from said first selection circuit, and to generate a 2k-bit multiplication-addition result;

an inverter connected to the selection circuit to invert a part of bits of the multiplication-addition result; and a storage connected to the addition circuit and the inverter and storing the result, and wherein said arithmetic device has an operation mode in which said first selection circuit selects a j-th block $n_j$ of the integer N the multiplicand A, selects a carry from a multiplication-addition of a (j−1)th block the number C, and selects a j-th block $y_j$ as the number D, said encoder circuit outputs a selection signal for selection of a partial product indicating −A when i is 0, and outputs a selection signal for selection of a partial product indicating 0 when i is a value other than 0, said addition circuit generates a one's complement of the multiplicand A from the partial product indicating −A, and outputs a result of adding up the one's complement of the multiplicand A, the number C, and the number D a multiplication-addition result of a j-th block, and said inverter inverts a part of bits of the multiplication-addition result of the j-th block, and generates a carry to a multiplication-addition of a (j+1)th block.

* * * * *